United States Patent
Cheng

(10) Patent No.: US 11,645,475 B2
(45) Date of Patent: May 9, 2023

(54) TRANSLATION PROCESSING METHOD AND STORAGE MEDIUM

(71) Applicant: FUJITSU LIMITED, Kawasaki (JP)

(72) Inventor: Yuchang Cheng, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 16/780,963

(22) Filed: Feb. 4, 2020

(65) Prior Publication Data

US 2020/0250383 A1 Aug. 6, 2020

(30) Foreign Application Priority Data

Feb. 5, 2019 (JP) .............................. JP2019-019167

(51) Int. Cl.
*G06F 40/44* (2020.01)
*G06F 40/268* (2020.01)
(Continued)

(52) U.S. Cl.
CPC ............ *G06F 40/44* (2020.01); *G06F 40/166* (2020.01); *G06F 40/268* (2020.01); *G06F 40/30* (2020.01);
(Continued)

(58) Field of Classification Search
CPC .......... G06F 40/40; G06F 40/42; G06F 40/51; G06F 40/53
See application file for complete search history.

(56) References Cited

U.S. PATENT DOCUMENTS

| 7,620,538 | B2 * | 11/2009 | Marcu ................... G06F 40/242 |
| | | | 704/7 |
| 8,504,354 | B2 * | 8/2013 | Quirk ..................... G06F 40/44 |
| | | | 704/8 |

(Continued)

FOREIGN PATENT DOCUMENTS

| JP | 2004-310170 A | 11/2004 |
| JP | 2005-092253 A | 4/2005 |

(Continued)

OTHER PUBLICATIONS

Hewavitharana et al., "Extracting parallel phrases from comparable data." Building and using comparable corpora. Springer, Berlin, Heidelberg. (Year: 2013).*

(Continued)

*Primary Examiner* — Samuel G Neway
(74) *Attorney, Agent, or Firm* — Fujitsu Patent Center

(57) ABSTRACT

A translation processing method executed by a computer, the translation processing method includes calculating a first translation probability from each of first phonemes included in a first document described in a first language into each of second phonemes included in a second document, whose contents substantially equivalent to those of the first document, described in a second language and a second translation probability from each of the second phonemes into each of the first phonemes; extracting a phoneme pair in which the first translation probability and the second translation probability are equal to or higher than a threshold value; and generating translation phrases in the first document and the second document based on the extracted phoneme pair.

4 Claims, 28 Drawing Sheets

(51) Int. Cl.
*G06F 40/30* (2020.01)
*G06F 40/166* (2020.01)
*G06F 40/58* (2020.01)
*G06F 40/51* (2020.01)
*G06F 40/53* (2020.01)
*G06F 40/40* (2020.01)
*G06F 40/42* (2020.01)

(52) U.S. Cl.
CPC .............. *G06F 40/40* (2020.01); *G06F 40/42* (2020.01); *G06F 40/51* (2020.01); *G06F 40/53* (2020.01); *G06F 40/58* (2020.01)

(56) References Cited

U.S. PATENT DOCUMENTS

| | | | |
|---|---|---|---|
| 2006/0009963 A1* | 1/2006 | Gaussier | G06F 40/45 704/7 |
| 2008/0097742 A1* | 4/2008 | Ushioda | G06F 40/45 704/3 |
| 2008/0120092 A1* | 5/2008 | Moore | G06F 40/45 704/4 |
| 2008/0300857 A1* | 12/2008 | Barbaiani | G06F 40/45 704/4 |
| 2014/0379329 A1* | 12/2014 | Dong | G06F 40/247 704/9 |
| 2016/0306794 A1 | 10/2016 | Huang et al. | |
| 2018/0018317 A1* | 1/2018 | Cheng | G06F 40/30 |
| 2020/0250383 A1* | 8/2020 | Cheng | G06F 40/166 |

FOREIGN PATENT DOCUMENTS

JP 2013-242654 A 12/2013
JP 2018-010514 A 1/2018

OTHER PUBLICATIONS

JPOA—Office Action of Japanese Patent Application No. 2019-019167 dated Oct. 4, 2022 with Full Machine Translation.

* cited by examiner

FIG. 3

| FIRST LANGUAGE | 先日／の／会見／で／富士通／タブレット／株式／会社／が／発表／した／… |
| --- | --- |
| SECOND LANGUAGE | Fujitsu Tablet/limited/announced/…… |

FIG. 4

| ORIGINAL LANGUAGE | TRANSLATION LANGUAGE | TRANSLATION PROBABILITY |
|---|---|---|
| 富士通 | Fujitsu Tablet | 0.68 |
| タブレット | Fujitsu Tablet | 0.67 |
| 富士通 | limited | 0.67 |
| タブレット | limited | 0.56 |
| 株式 | Fujitsu Tablet | 0.51 |
| 株式 | limited | 0.51 |
| Fujitsu Tablet | 富士通 | 0.65 |
| Fujitsu Tablet | タブレット | 0.63 |
| Fujitsu Tablet | 株式 | 0.1 |
| limited | 会社 | 0.67 |
| limited | 富士通 | 0.56 |
| limited | タブレット | 0.26 |
| ... | ... | ... |
| 富士通 | announced | 0.30 |
| が | Fujitsu Tablet | 0.05 |
| Fujitsu Tablet | が | 0.31 |
| announced | 富士通 | 0.09 |

FIG. 5

| FIRST LANGUAGE \ SECOND LANGUAGE | Fujitsu | Tablet | limited | announced | | | zzz | | ... |
|---|---|---|---|---|---|---|---|---|---|
| 先日 | × | × | × | × | × | ○ | × | × | ... |
| の | × | × | ○ | × | × | ○ | × | × | ... |
| 会見 | × | ○ | × | × | ○ | × | × | ○ | ... |
| で | × | × | × | × | × | × | × | × | ... |
| 富士通 | ○ | ○ | ○ | ○ | ○ | × | ○ | × | ... |
| タブレット | ○ | ○ | ○ | × | × | × | × | × | ... |
| 株式 | ○ | × | ○ | ○ | × | × | × | × | ... |
| 会社 | ○ | ○ | ○ | ○ | × | × | × | × | ... |
| が | × | ○ | × | × | × | × | × | × | ... |
| 発表 | ○ | × | × | ○ | ○ | ○ | ○ | × | ... |
| した | × | × | × | × | ○ | × | × | × | ... |
| ... | ... | ... | ... | ... | ... | ... | ... | ... | ... |

WHETHER TRANSLATION PROBABILITY OF FIRST LANGUAGE (JAPANESE) → SECOND LANGUAGE (ENGLISH) EXCEEDS THRESHOLD VALUE

WHETHER TRANSLATION PROBABILITY OF SECOND LANGUAGE (ENGLISH) → FIRST LANGUAGE (JAPANESE) EXCEEDS THRESHOLD VALUE

FIG. 6

EXTRACT WORD GROUP IN WHICH BOTH OF TRANSLATION PROBABILITIES IN BOTH DIRECTIONS EXCEED THRESHOLD VALUE

富士通 ⇔ Fujitsu Tablet
タブレット ⇔ Fujitsu Tablet
株式 ⇔ limited
会社 ⇔ Fujitsu Tablet limited

| FIRST LANGUAGE \ SECOND LANGUAGE | Fujitsu Tablet | | limited | | announced | | zzz | | ... |
|---|---|---|---|---|---|---|---|---|---|
| 先日 | × | × | × | × | × | ○ | × | × | ... |
| の | × | × | ○ | × | ○ | ○ | × | × | ... |
| 会見 | × | × | × | × | × | × | ○ | × | ... |
| で | × | × | × | × | × | × | × | × | ... |
| 富士通 | ○ | ○ | ○ | ○ | ○ | × | ○ | × | ... |
| タブレット | ○ | ○ | ○ | ○ | × | × | × | × | ... |
| 株式 | × | ○ | ○ | ○ | × | × | × | × | ... |
| 会社 | ○ | ○ | ○ | ○ | × | × | × | × | ... |
| が | × | ○ | × | ○ | × | × | × | × | ... |
| 発表 | × | × | ○ | × | ○ | ○ | ○ | ○ | ... |
| した | × | × | × | × | ○ | × | × | × | ... |
| ... | ... | ... | ... | ... | ... | ... | ... | ... | ... |

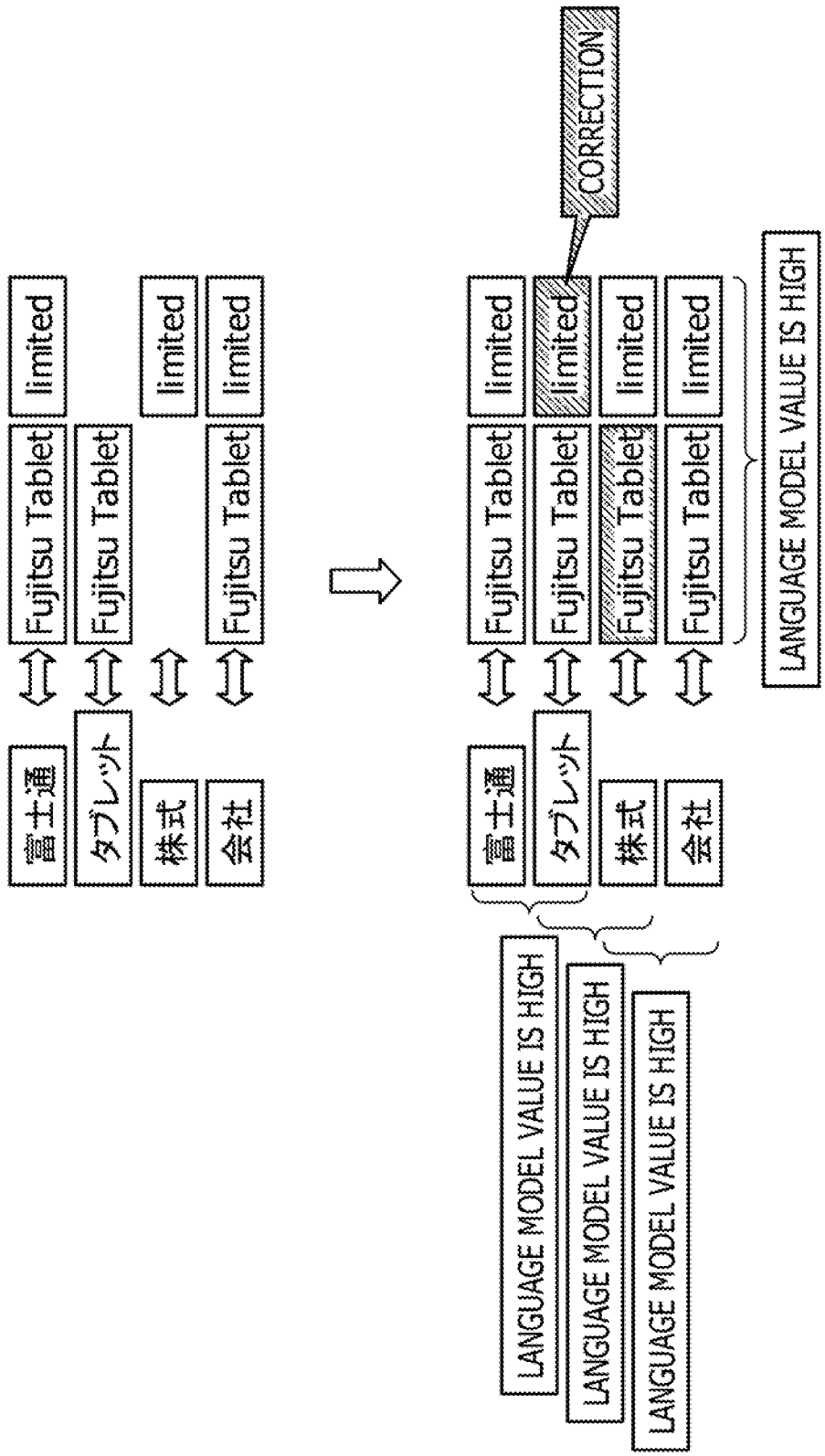

FIG. 9

DATA AFTER REPLACEMENT

| FIRST LANGUAGE | 先日/の/会見/で/富士通タブレット株式会社/が/発表/した/… |
| SECOND LANGUAGE | Fujitsu Tablet limited/announced/…… |

⇩

| ORIGINAL LANGUAGE | TRANSLATION LANGUAGE | TRANSLATION PROBABILITY |
|---|---|---|
| 富士通タブレット株式会社 | Fujitsu Tablet limited | 0.80 (INCREASE) |
| Fujitsu Tablet limited | 富士通タブレット株式会社 | 0.79 (INCREASE) |

FIG. 12

| ORIGINAL LANGUAGE | TRANSLATION LANGUAGE | TRANSLATION PROBABILITY |
|---|---|---|
| 富士通 | Fujitsu Tablet | 0.68 |
| タブレット | Fujitsu Tablet | 0.67 |
| 富士通 | limited | 0.67 |
| タブレット | limited | 0.56 |
| 株式会社 | Fujitsu Tablet | 0.51 |
| 株式会社 | limited | 0.21 |
| Fujitsu Tablet | 富士通 | 0.65 |
| Fujitsu Tablet | タブレット | 0.63 |
| Fujitsu Tablet | 株式会社 | 0.1 |
| limited | 株式会社 | 0.1 |
| limited | 富士通 | 0.56 |
| limited | タブレット | 0.26 |
| ... | ... | ... |
| 富士通 | announced | 0.30 |
| が | Fujitsu Tablet | 0.05 |
| Fujitsu Tablet | が | 0.31 |
| announced | 富士通 | 0.09 |

THRESHOLD VALUE DECISION (0.3)

KNOWN TRANSLATION PHRASE [株式会社: limited]

| FIRST LANGUAGE \ SECOND LANGUAGE | Fujitsu Tablet | | limited | | announced | | zzz | | ... |
|---|---|---|---|---|---|---|---|---|---|
| 先日 | × | × | × | × | × | × | × | × | ... |
| の | × | × | ○ | × | ○ | ○ | × | × | ... |
| 会見 | × | ○ | × | × | × | ○ | ○ | × | ... |
| で | ○ | ○ | ○ | × | ○ | × | × | ○ | ... |
| 富士通 | ○ | ○ | × | ○ | × | × | × | × | ... |
| タブレット | ○ | ○ | ○ | ○ | × | × | × | × | ... |
| 株式会社 | ○ | ○ | ○ | ○ | × | × | × | × | ... |
| 会社 | × | × | × | × | × | × | × | × | ... |
| が | ○ | ○ | × | × | ○ | ○ | × | × | ... |
| 発表 | × | × | × | × | × | × | × | × | ... |
| した | ○ | × | × | × | ○ | ○ | × | × | ... |
| ... | ... | ... | ... | ... | ... | ... | ... | ... | ... |

TRANSLATION PROCESSING METHOD AND STORAGE MEDIUM

CROSS-REFERENCE TO RELATED APPLICATION

This application is based upon and claims the benefit of priority of the prior Japanese Patent Application No. 2019-19167, filed on Feb. 5, 2019, the entire contents of which are incorporated herein by reference.

FIELD

The embodiments discussed herein relate to a translation processing method and a storage medium.

BACKGROUND

In a global company or the like, since its company terminology is included in business documents, maintenance of a translation dictionary for accurately translating the meaning of the company terminology is performed in multilingualization of internal documents. Further, as maintenance target data of the translation dictionary, a first multilingual document pair (parallel corpus) that is high in maintenance cost and in which two documents indicate line by line correspondence and a second multilingual document pair (comparable corpus) that can be maintained easily and in which two documents indicate correspondence in gist of contents are used.

The "parallel corpus" is a document pair that indicates full correspondence of two documents in a unit of a sentence in proper quantities of meanings and is a record of proceedings, an official document or the like officially announced by each country. The "comparable corpus" is a document pair in which granularity of information is different for each page and is a Web page or the like presenting various kinds of information of a press release of a company, a tourist spot or the like.

In recent years, such a thing has been done that a translation phrase is extracted from a second multilingual document pair (comparable corpus) that takes a lower maintenance cost. For example, there is a technique in which a word semantic classification technology (topic model) is used to group words of a document group for each semantic class and then a translation phrase is extracted by calculation of a word correspondence probability (word alignment).

In extraction of a translation phrase, it is demanded to put a technical term configured from a plurality of words together as one word (such term is hereinafter referred to sometimes as compound word). For example, an example is considered in which translation phrases are extracted from a document of the Japanese language and a document of the English language that are applicable as the second multilingual document pair (comparable corpus). As an example, it is assumed that "電子/加速/装置" is extracted as a result of morphological analysis of the Japanese document and "the/electronic/acceleration/device" is extracted as a result of morphological analysis of the English document.

In this case, in the case where the technical term is not identified as one word, [電子 : electronic], [加速 : acceleration], and [装置 : device] are generated as translation phrases. On the other hand, in the case where the technical term is identified as one word by the compound word technology, [電子加速装置 : electronic acceleration device] is created as the translation phrases.

Since contents of a translation phrase differ depending upon in what manner a word is to be delimited in this manner, a technology is demanded by which, from multilingual document groups that correspond in contents to each other, a translation word of a technical term (compound word) configured from a plurality of words are extracted accurately. For example, there is a technology by which a compound word candidate is extracted in accordance with a language-dependent compound word extraction rule and appropriateness of the compound word candidate is decided by a plurality of statistical techniques and then a word decided as a compound word is determined as one word, whereafter a general translation probability of the word is calculated to perform translation extraction of a compound word. As related arts, for example, Japanese Laid-open Patent Publication No. 2013-242654, Japanese Laid-open Patent Publication No. 2004-310170, Japanese Laid-open Patent Publication No. 2005-92253 and so forth are disclosed.

SUMMARY

According to an aspect of the embodiments, a translation processing method executed by a computer, the translation processing method includes calculating a first translation probability from each of first phonemes included in a first document described in a first language into each of second phonemes included in a second document, whose contents substantially equivalent to those of the first document, described in a second language and a second translation probability from each of the second phonemes into each of the first phonemes; extracting a phoneme pair in which the first translation probability and the second translation probability are equal to or higher than a threshold value; and generating translation phrases in the first document and the second document based on the extracted phoneme pair.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a view depicting an example of a result of morphological analysis;

FIG. 4 is a view depicting an example of a calculation result of a translation probability;

FIG. 5 is a view depicting an example of a statistical result;

FIG. 6 is a view illustrating specification of a boundary of a compound word;

FIG. 7 is a view illustrating correction;

FIG. 9 is a view illustrating evaluation of a compound word candidate;

FIG. 12 is a view of specification of a boundary of a compound word based on a known translation phrase according to the working example 2;

DESCRIPTION OF EMBODIMENTS

However, according to the technology described above, since a high translation probability is sometimes applied in error also to a word with regard to which the partner language does not have a corresponding phrase, accurate identification of a translation phrase group of a compound word sometimes results in failure, and the generation accuracy of a translation phrase decreases.

An example is considered in which a translation phrase is extracted from a document of the Japanese language and a document of the English language similarly as in the example described above. As an example, it is assumed that, as a result of morphological analysis of the Japanese document, " 我々/は/先日/電子/ 加速/装置/で /実験/を/ . . . " is extracted, and as a result of morphological analysis of the English document, "We/used/the/electronic/acceleration/device/to/experiment/ . . . " is extracted. In this case, in the case where the co-occurrence probability of [先日] and a term such as [electronic] is high, the possibility is high that it may be decided in error that "先日電子加速装置" is a translation phrase of [electronic/acceleration/device]. Taking the foregoing into consideration, it is desirable to improve the generation accuracy of a translation phrase.

In the following, working examples of a translation processing method and a translation processing program disclosed herein are described in detail with reference to the drawings. The present technology shall not be restricted by the working examples. Further, the working examples can be combined suitably if there is no contradiction.

Working Example 1

[Description of Translation Processing Apparatus 10]

A translation processing apparatus 10 according to the working example 1 is an example of a computer apparatus that extracts a translation phrase from a second multilingual document pair (comparable corpus) that can be maintained easily and in which two documents correspond to each other in terms of the gist and generates a translation dictionary.

Figure 1:
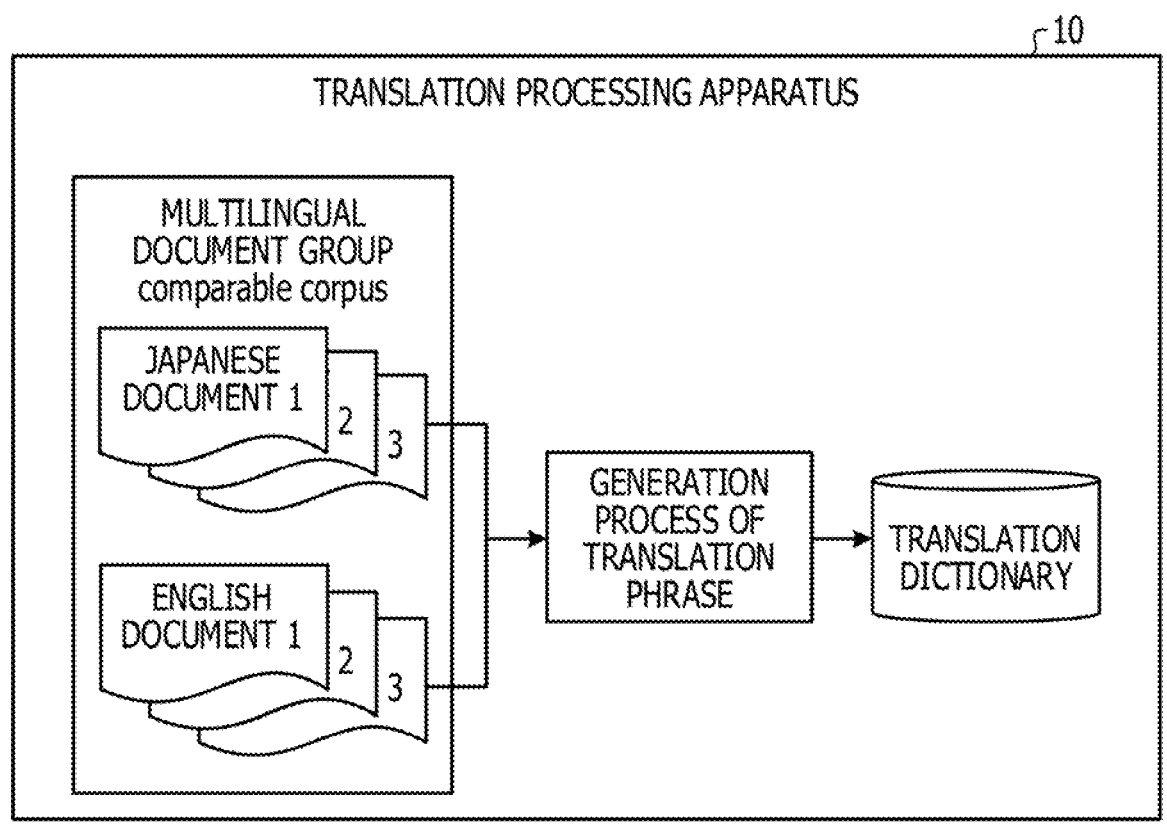
FIG. 1 is a view illustrating extraction of a translation phrase according to a working example 1.

FIG. 1 is a view illustrating extraction of a translation phrase according to the working example 1. As depicted in FIG. 1, the translation processing apparatus 10 retains a Japanese document 1—English document 1, a Japanese document 2—English document 2, and a Japanese document 3—English document 3 as a multilingual document group that is a comparable corpus. Here, the Japanese document 1—English document 1, Japanese document 2—English document 2, and Japanese document 3—English document 3 are documents in which same contents are described and are document pairs in which the granularity of information is different for each page. In the working examples, a Japanese document is sometimes referred to as first language document or the like and an English document is sometimes referred to as second language document or the like.

The translation processing apparatus 10 extracts a plurality of candidates for an unknown word in which the co-occurrence probability of a word configuring a Japanese document with a word configuring an English document satisfies a condition set in advance and besides the co-occurrence probability of a word configuring the English document with a word configuring the Japanese document satisfies a condition set in advance and which indicates a range of a word string. Then, the translation processing apparatus 10 associates, from among the extracted plurality of candidates for an unknown word, a range of a word string in which the co-occurrence probability in any document of the document pair satisfies a condition set in advance as an unknown word.

For example, the translation processing apparatus 10 extracts a word pair group of a high co-occurrence probability from among the multilingual document pair in which two documents correspond to each other in terms of the gist. Then, the translation processing apparatus 10 determines maximum boundaries of the word pairs and calculates the translation probability again deeming a word string between the boundaries as one word. Then, in the case where the translation probability after the re-calculation of the deemed word pair is higher than those of the word pairs between the boundaries, the translation processing apparatus 10 decides the deemed word pair as a compound word pair.

Since the translation processing apparatus 10 can accurately cut out a compound word and a non-registered word of a technical term or the like and extract a translation relationship in this manner, the generation accuracy of a translation phrase can be improved.

[Functional Configuration]

Figure 2:
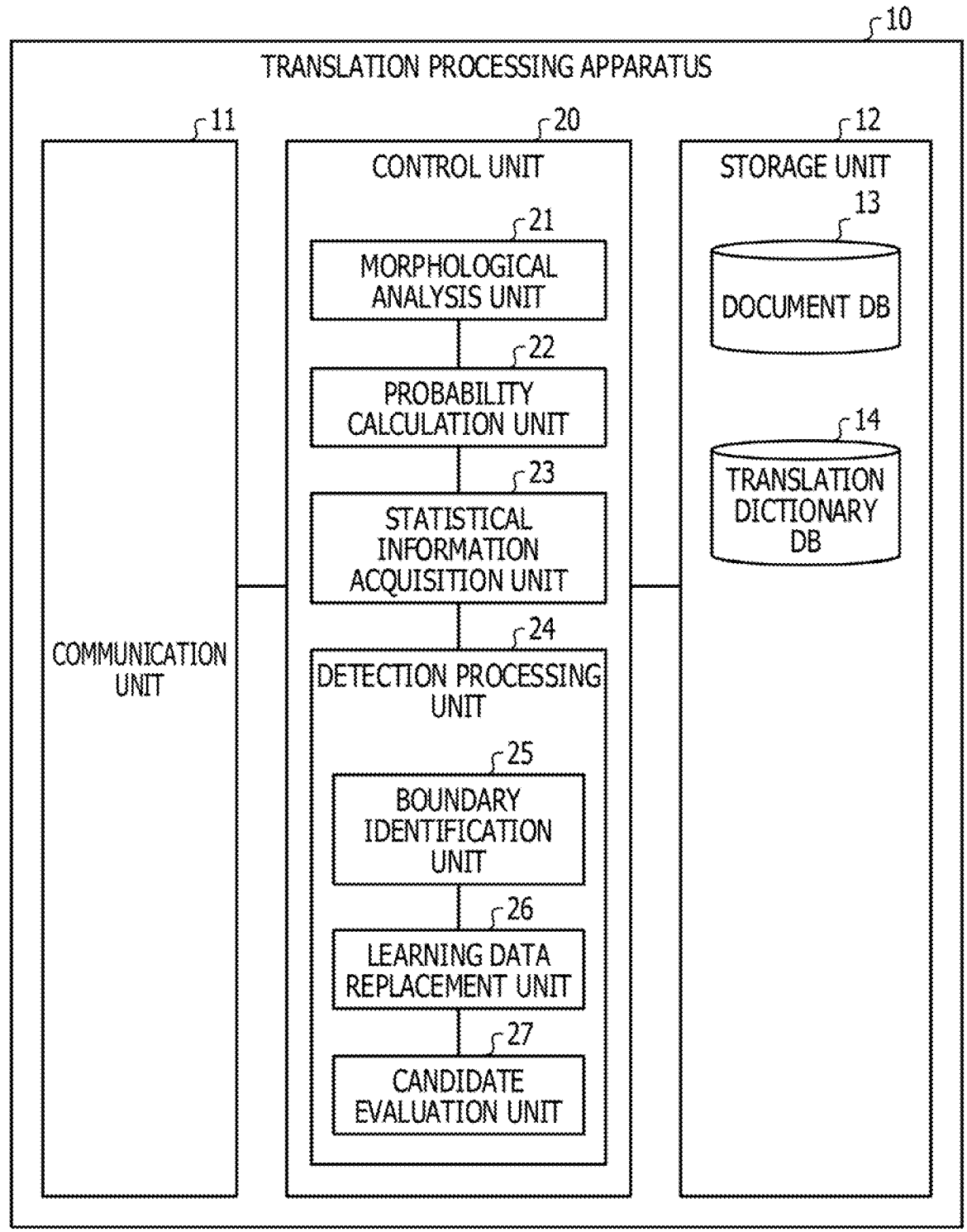
FIG. 2 is a functional block diagram depicting a functional configuration of a translation processing apparatus according to the working example 1.

FIG. 2 is a functional block diagram depicting a functional configuration of a translation processing apparatus according to the working example 1. The translation processing apparatus depicted in FIG. 2 may be the translation processing apparatus 10 depicted in FIG. 1. As depicted in FIG. 2, the translation processing apparatus 10 includes a communication unit 11, a storage unit 12, and a control unit 20.

The communication unit 11 is a processing unit that controls communication with another apparatus and is, for example, a communication interface. For example, the communication unit 11 receives a processing starting instruction from a management apparatus that is utilized by a manager or the like and transmits a result of the processing to the management apparatus. Further, the communication unit 11 acquires document information from various database servers or the like.

The storage unit 12 is an example of a storage device that stores data, programs to be executed by the control unit 20 and so forth, and is, for example, a memory or a hard disk. The storage unit 12 stores a document database (DB) 13 and a translation dictionary DB 14 therein.

The document DB 13 is a database that stores multilingual document pairs that are an extraction source of translation phrases and have a relationship of comparable corpus. For example, the document DB 13 stores a Japanese document described in Japanese and an English document in which contents same as those of the Japanese language are described in an associated relationship with each other.

A document pair stored here is a set of multilingual documents in which the documents correspond to each other in terms of the gist. For example, although items of the Internet Encyclopedia or the like are different in detailed contents in pages unique to the individual languages, since the pages themselves are same as each other in terms of the gist (items), pages of different languages of the same item are translation documents whose contents correspond to each other in terms of the gist. The document format may be text data or any other format.

The translation dictionary DB 14 is a database that stores translation phrases. For example, the translation dictionary DB 14 stores known translation phrases, translation phrases generated newly by the translation processing apparatus 10 and so forth. For example, the translation dictionary DB 14 stores, as a translation phrase [Japanese: English], [富士通 : Fujitsu] or the like.

The control unit 20 is a processing unit that controls the entire translation processing apparatus 10 and is, for example, a processor. The control unit 20 includes a morphological analysis unit 21, a probability calculation unit 22, a statistical information acquisition unit 23, and a detection processing unit 24.

The morphological analysis unit 21 is a processing unit that executes morphological analysis for documents that are document pairs stored in the document DB 13. For example, the morphological analysis unit 21 extracts a character string (text) from each of a document of a first language that is a Japanese document and a document of a second language that is an English document and performs morphological analysis for the character strings to convert the character strings into morphological sequences. In this manner, the morphological analysis unit 21 extracts morphemes (words) from the documents and outputs the morphemes to the probability calculation unit 22.

FIG. 3 is a view depicting an example of a result of morphological analysis. As depicted in FIG. 3, from the document of the first language, " 先日/の/会見/で/富士通/タブレット/株式/会社/が/発表/した/ . . . " is extracted. Similarly, from the document of the second language, "Fujitsu Tablet/limited/announced/ . . . " is extracted. For the morphological analysis, various techniques of open software or the like can be used.

The probability calculation unit 22 is a processing unit that estimates a translation probability of a word in regard to text data divided already in a unit of a word. For example, the probability calculation unit 22 calculates, in regard to an analysis result of the morphological analysis unit 21, a translation probability of a word in both directions between the languages. The translation probability in both directions of a word indicates a translation probability from the first language to the second language and a translation probability from the second language to the first language. For the translation probability, a known translation model or the like can be used based on co-occurrence statistical information of a word between languages.

Then, the probability calculation unit 22 temporarily stores a result of the calculation into the storage unit 12 or outputs the same to the statistical information acquisition unit 23. FIG. 4 is a view depicting a result of a calculation result of a translation probability. As depicted in FIG. 4, the probability calculation unit 22 generates a calculation result including "original language, translation language, and translation probability." In the example of FIG. 4, it is indicated that the translation probability from "富士通" extracted from the document of the first language into "Fujitsu Tablet" extracted from the document of the second language is "0.68."

The statistical information acquisition unit 23 is a processing unit that acquires statistical information such as an appearance frequency of each word, a language model, a co-occurrence probability with all words of the partner language and so forth from an output of the probability calculation unit 22. For example, the statistical information acquisition unit 23 refers to the translation probabilities from the first language to the second language and the translation probabilities from the second language to the first language to aggregate whether or not the translation probabilities are equal to or higher than a threshold value (for example, 0.3) and outputs a result of the aggregation to the detection processing unit 24.

FIG. 5 is a view depicting an example of a statistical result. As depicted in FIG. 5, the statistical information acquisition unit 23 generates a statistical result in which, in regard to each of the words extracted from each language, a round mark "○" is set in the case where the translation probability is equal to or higher than the threshold value, but a cross mark "×" is set in the case where the translation probability is lower than the threshold value. For example, since the translation probability from the Japanese word "富士通" to the English word "Fujitsu Tablet" is "0.68," the statistical information acquisition unit 23 sets "○," and since the translation probability of the English word "Fujitsu Tablet" to the Japanese word "富士通" is "0.65," the statistical information acquisition unit 23 sets "○." In the example of FIG. 5, it can be recognized that the translation probability from the Japanese word "先日" to the English word "Fujitsu Tablet" is lower than the threshold value and besides the translation probability of the English word "Fujitsu Tablet" to the Japanese word "先日" is lower than the threshold value.

Further, the statistical information acquisition unit 23 calculates, for each word (morpheme), an evaluation value for a language model (hereinafter referred to sometimes as language model value) using a known language model such the 1-gram language model. Then, the statistical information acquisition unit 23 retains the language model value for each word in an associated relationship with each word of the statistical result.

The detection processing unit 24 includes a boundary identification unit 25, a learning data replacement unit 26, and a candidate evaluation unit 27 and is a processing unit that extracts translation phrases to generate a translation dictionary based on the statistical result. For example, the detection processing unit 24 detects an unknown word that is not known as a phrase and specifies a translation phrase of the unknown word.

The boundary identification unit 25 is a processing unit that determines maximum boundaries of a word example pair between which a condition for a multilingual document pair is satisfied from an output of the morphological analysis unit 21 and statistical information of the statistical information acquisition unit 23. Here, the condition includes a condition 1 and a condition 2 given below.

Condition 1: other words (A2, A3, . . . ) in the vicinity before and after a first language word (A1) of a certain word pair {A1, B1} have high translation probabilities in both directions with a second language word (B1) of the word pair (in both directions from the first language to the second language and from the second language to the first language)

Condition 2: the condition of the condition 1 is satisfied also in regard to neighboring words (B2, B3, . . . ) of the second language word (B1) of the word pair (A1, B1) of the condition 1 and besides the evaluation value of the language models of the neighboring words (A1A2, A2A3, B1B2, B2B3, . . . ) is high For example, in the case where a translation of a compound word exists, since co-occurrence of constituent words of the compound word and constituent words of the partner language is much, the translation probability in both directions between the words is high. In the example of FIG. 5, { 富士通 : Fujitsu Tablet}, { タブレット : Fujitsu Tablet} and so forth have a high translation probability in both directions.

Further, constituent words of a compound word have a high translation probability in both directions with all constituent words of the compound word of the partner language. In the example of FIG. 5, the term " 富士通 " has a high translation probability in both directions with "Fujitsu Tablet" and "limited," and "Fujitsu Tablet" has a translation probability that is high in both directions with "会社," "富士通," and " タブレット ." For example, in the case where the character string " 富士通 " appears on the Japanese language side, "Fujitsu Tablet" and "limited" appear on the English language side, and this similarly applies also to the opposite direction.

Further, a boundary of a combination that indicates a high translation probability in both directions is a boundary of a compound word. In the example of FIG. 5, since " 富士通 " and "announced" have a high translation probability only in one direction, "announced" is outside the boundary of a compound word. In the case where the character string " 富士通 " appears at the Japanese language side, although it is considered a little that "announced" appears at the English language side. However, in the case where "announced" appears at the English language side in the opposite direction, since co-occurrence at the Japanese language side is little, it can be decided that the translations of " 富士通 " and "announced" do not have a compound word relationship.

Similarly, in regard to a word whose corresponding language is not found in the partner language like " 先日 ," a case in which both of the translation probabilities in both directions are high is not found, and such word is less included in the compound word. Therefore, a wrong decision that " 先日 " is part of the compound word can be reduced. Further, in the case where a particle of the Japanese language such as " が " or " に ," it is less likely to occur that the co-occurrence probability with a specific word other than "in" or "on" at the English language side becomes high, and therefore, the particle is not included in the compound word.

Here, a particular example in which a boundary is identified to correct a word taking the condition 1 and the condition 2 described hereinabove into consideration is described. FIG. 6 is a view illustrating specification of a boundary of a compound word. FIG. 7 is a view illustrating correction.

In the case of FIG. 5, the boundary identification unit 25 specifies, as a set of morphemes whose translation probabilities in both directions are equal to or higher than the threshold value, " 富士通 : Fujitsu Tablet," " タブレット : Fujitsu Tablet," and " 会社 : limited." Similarly, the boundary identification unit 25 specifies " 富士通 : limited," " 株式 : limited," and " 会社 : limited." The language model value of each morpheme specified here is equal to or higher than the threshold value.

Then, as depicted in FIG. 6, the boundary identification unit 25 specifies, as a set in which the language model value is equal to or higher than the threshold value and besides the translation probabilities in both directions are equal to or higher than the threshold value, " 富士通 " and "Fujitsu Tablet" and "limited," and similarly species " 会社 " and "Fujitsu Tablet" and "limited." Then, since they are boundaries of a range enclosed by morphemes whose translation probabilities in both directions are equal to or higher than the threshold value, they are determined as boundaries of a compound word.

Further, the boundary identification unit 25 specifies, in regard to " タブレット " and " 株式 " existing between " 富士通 " and " 会社 " of the Japanese language specified as the boundaries, a set whose translation probabilities in the opposite direction are equal to or higher than the threshold value. For example, the boundary identification unit 25 specifies " タブレット : Fujitsu Tablet" and specifies " 株式 : limited."

Then, the boundary identification unit 25 performs correction for words exiting in the inside of the boundaries. As depicted in FIG. 7, the boundary identification unit 25 specifies " タブレット " and " 株式 " existing between " 富士通 " and " 会社 " that are the boundaries. Then, the boundary identification unit 25 corrects (Interpolates), in regard to specified " タブレット ," "limited" that is high in translation probability with " 富士通 " and " 会社 " that are the boundaries but is low in translation probability with " タブレット ." Similarly, the boundary identification unit 25 corrects (interpolates), with regard to specified " 株式 ," "Fujitsu Tablet" that is high in translation probability with " 富士通 " and " 会社 " that are the boundaries but is low in translation probability with " 株式 ." In the case where the language model value of a word of a correction target is lower than the threshold value, also it is possible to suppress correction.

In this manner, since it is considered that a certain morpheme having a high language model value has a high co-occurrence ratio with preceding and succeeding morphemes, the boundary identification unit 25 performs correction of a word taking the context of the morpheme. As a result, the boundary identification unit 25 executes detection of an unknown word that was unknown at the stage of morphological analysis. Then, the boundary identification unit 25 outputs information after the correction to the learning data replacement unit 26.

Referring back to FIG. 2, the learning data replacement unit 26 replaces, in a result of the morphological analysis unit 21, a morpheme string corresponding to a deemed word pair candidate of a compound word detected by the boundary identification unit 25 with a deemed compound word to generate a new morphological analysis result.

Description is given in connection with the example described above. The learning data replacement unit 26 generates a compound word from the correction result depicted in FIG. 7. For example, in regard to the Japanese language that is the first language, the learning data replacement unit 26 decides that the translation probabilities in both directions of "富士通," "タブレット," "株式," and "富士通" have become equal to or higher than the threshold value, and summarizes them into "富士通タブレット株式会社" and deems this as one compound word.

Similarly, in regard to the English language that is the second language, the learning data replacement unit 26 decides that the translation probabilities in both directions of "Fujitsu Tablet" and "limited" are equal to or higher than the threshold value and summarizes them into "Fujitsu Tablet limited" and deems this as one compound word.

Figure 8:
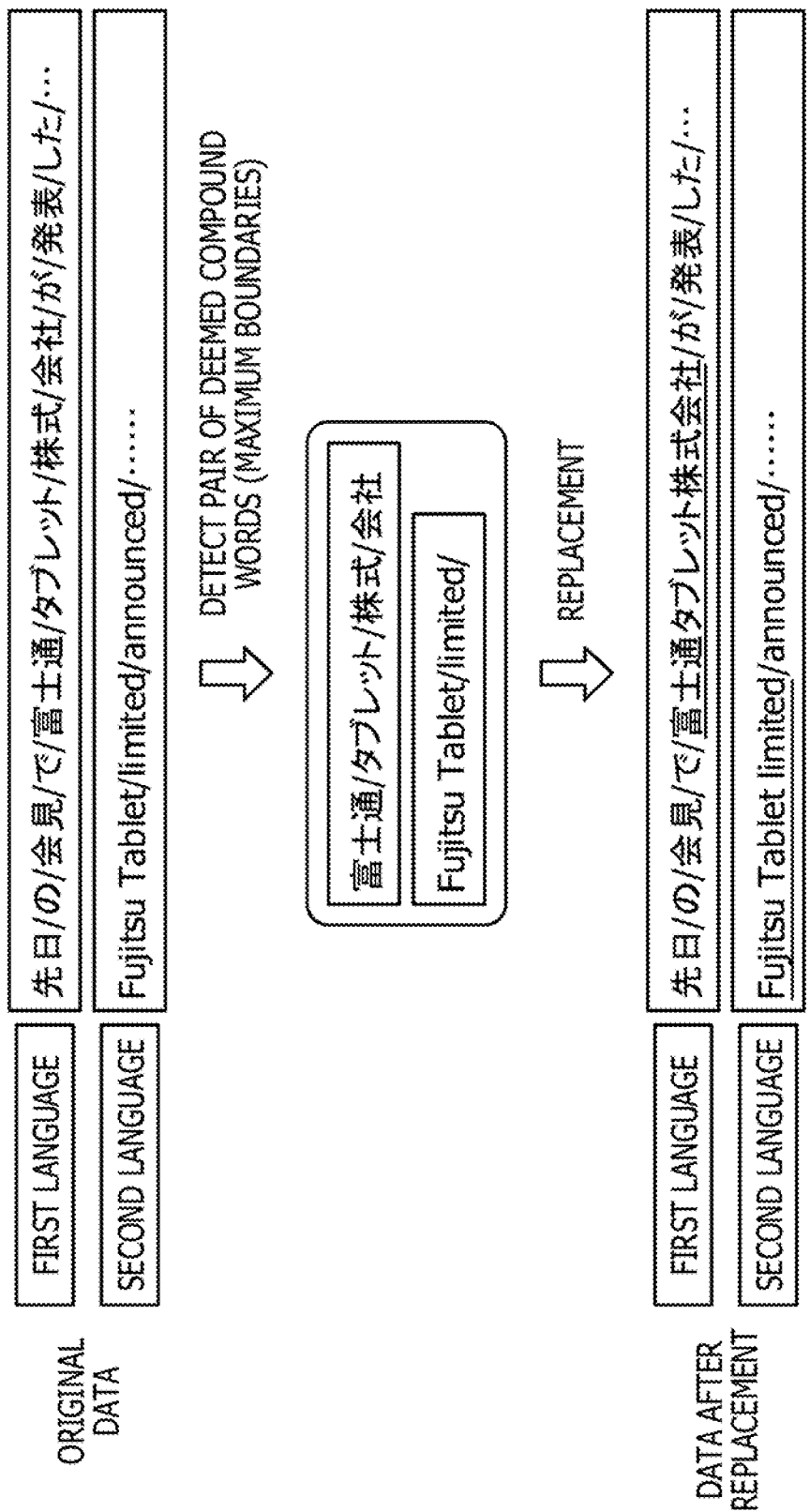
FIG. 8 is a view illustrating replacement of learning data.

Then, the learning data replacement unit 26 replaces the result of the morphological analysis depicted in FIG. 3 with a deemed compound word deemed as one compound word. FIG. 8 is a view illustrating replacement of learning data. As depicted in FIG. 8, the learning data replacement unit 26 replaces the morphological analysis result of the first language " 先日/の/会見/で/富士 通/タブレット/株式 /会社/が/発表/した/ . . . " into " 先日/の/会見/で/富士 通タブレット株式 会社/が/発表/した/ . . . " such that the deemed compound word " 富士通タブレット株式会社 " becomes one morpheme.

Similarly, the learning data replacement unit 26 replaces the morphological analysis result of the second language "Fujitsu Tablet/limited/announced/ . . . " into "Fujitsu Tablet limited/announced/ . . . " such that the deemed compound word "Fujitsu Tablet limited" becomes one morpheme. Then, the learning data replacement unit 26 outputs the learning data after the replacement to the candidate evaluation unit 27.

The candidate evaluation unit 27 is a processing unit that decides whether a pair of deemed compound words detected by the boundary identification unit 25 after the probability calculation unit 22 recalculates, in regard to the learning data generated newly by the learning data replacement unit 26, translation probabilities in both directions of all word pairs are an accurate compound word pair. For example, the candidate evaluation unit 27 outputs data after replacement acquired from the learning data replacement unit 26 to the probability calculation unit 22 and requests the probability calculation unit 22 to calculate a translation probability regarding the data after replacement.

Thereafter, the candidate evaluation unit 27 acquires a result of the calculation of the translation probabilities of the words regarding the data after replacement from the probability calculation unit 22. Then, in the case where the translation probability of the data after replacement indicates increase from that of the data before replacement, the candidate evaluation unit 27 decides that the pair of the compound words that are a replacement target are an accurate compound word pair and registers the pair of the compound words into the translation dictionary DB 14. On the other hand, in the case where the translation probability of the data after replacement does not indicate increase from that of the data before replacement, the candidate evaluation unit 27 does not decide that the pair of the compound words that are a replacement target are an accurate compound word pair and does not register the pair of the compound words into the translation dictionary DB 14 neither.

FIG. 9 is a view illustrating evaluation of a compound word candidate. The candidate evaluation unit 27 outputs the first language " 先日/の/会見/で/富 士通タブレット株式会社/が/発表/した/ . . . " and the second language "Fujitsu Tablet limited/announced/ . . . " that are the data after replacement to the probability calculation unit 22.

Then, the candidate evaluation unit 27 acquires a list of recalculated translation probabilities including the translation probability "0.80" from " 富士通タブレット " to "Fujitsu Tablet limited" and the translation probability "0.79" from "Fujitsu Tablet limited" to " 富士通タブレット ."

Here, the candidate evaluation unit 27 compares the translation probabilities after replacement and the translation probabilities of the words before replacement decided as the boundaries of the compound word in FIG. 6. For example, referring to FIGS. 4 and 6, the candidate evaluation unit 27 acquires the translation probability "0.68" from " 富士通 " to "Fujitsu Tablet" and the translation probability "0.65" from "Fujitsu Tablet" to " 富士通 " in the opposite direction. Similarly, the candidate evaluation unit 27 acquires the translation probability "0.67" from " 富士通 " to "limited" and the translation probability "0.56" in the opposite direction.

In this manner, the candidate evaluation unit 27 acquires the translation probabilities in both directions of " 富士通 " and "Fujitsu Tablet," translation probabilities in both directions of " 富士通 " and "limited," translation probabilities in both directions of " タブレット " and "Fujitsu Tablet," translation probabilities in both directions of " タブレット " and "limited," translation probabilities in both directions of " 株式 " and "Fujitsu Tablet," translation probabilities in both directions of " 株式 " and "limited," translation probabilities in both directions of " 会社 " and "Fujitsu Tablet," and translation probabilities in both directions of " 会社 " and "limited."

Then, in the case where a translation probability after replacement is higher than any one of the translation probabilities before replacement, the candidate evaluation unit 27 decides that the compound word pair after replacement is a correct translation phrase. In this example, since the translation probabilities in both directions "0.80" and "0.79" of " 富士通タブレット : Fujitsu Tablet limited" are higher than any of the translation probabilities before replacement, the candidate evaluation unit 27 decides " 富士通タブレット : Fujitsu Tablet limited" as a correct translation.

For example, if the translation probabilities in both directions of " 富士通タブレット 株式会社 " and "Fujitsu Tablet limited" are recalculated regarding each of them as one word, since both character strings appear at the same time, the translation probabilities in both directions are higher than translation probabilities of the individual words ( 富士通 , Fujitsu Tablet and so forth). Then, the candidate evaluation unit 27 registers " 富士通タブレット : Fujitsu Tablet limited" as a new translation phrase into the translation dictionary DB 14.

The criterion for decision of whether or not a compound word pair after replacement is correct is not limited to that in the case where the translation probability of the compound word pair is higher than any translation probability before replacement, and can be changeably set arbitrarily to that in the case where the translation probability of the compound word pair is higher than an average value of the translation probabilities before replacement.

[Flow of Processing]

Figure 10:
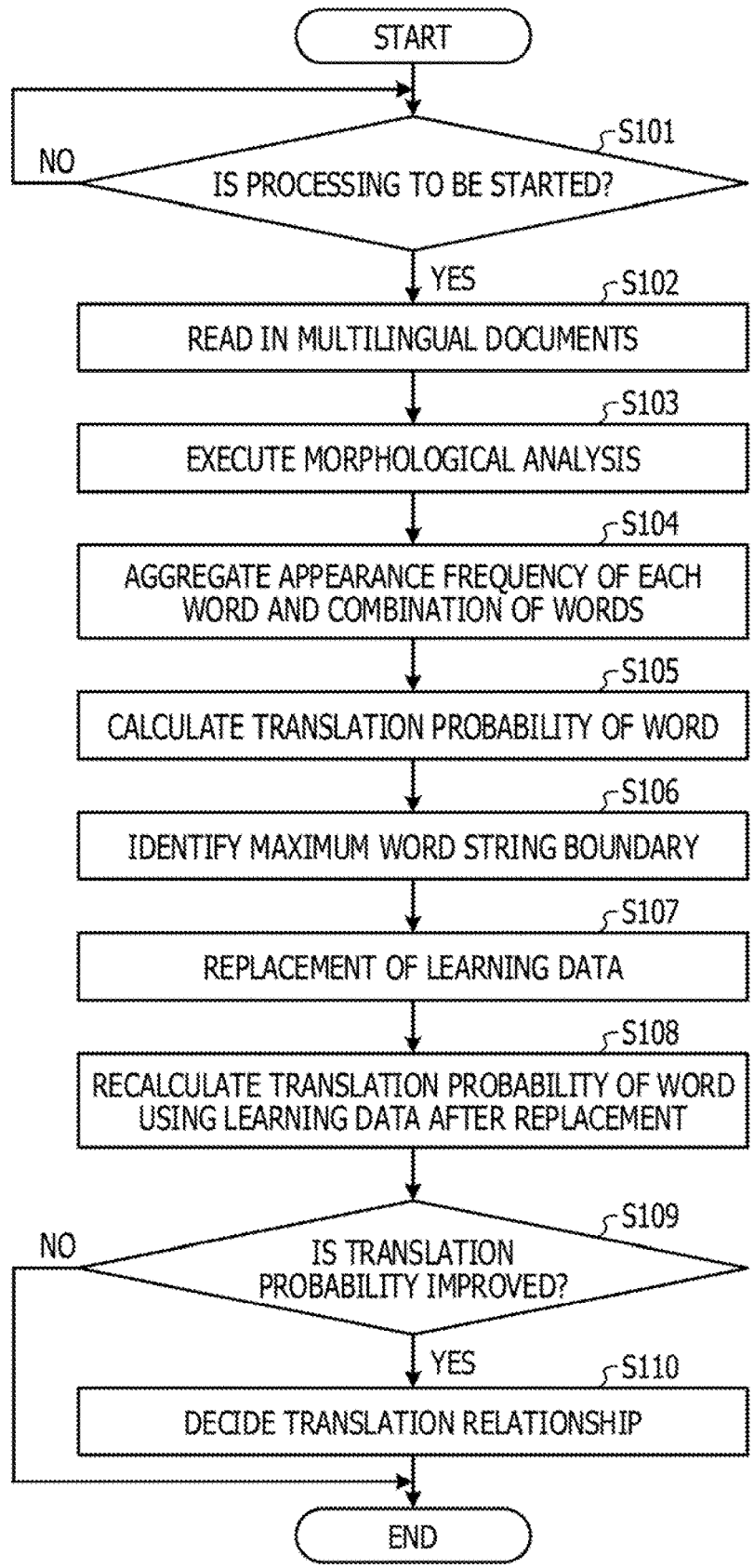
FIG. 10 is a flow chart depicting a flow of processing according to the working example 1.

FIG. 10 is a flow chart depicting a flow of processing according to the working example 1. As depicted in FIG. 10, If an instruction to start processing is received from a manager or the like (S101: Yes), the morphological analysis unit 21 reads in a multilingual document pair from the document DB 13 (S102) and executes morphological analysis of the multilingual documents to extract words (morphemes) (S103).

Then, the probability calculation unit 22 aggregates appearance frequencies of the words and combinations and so forth of the words (S104) and calculates a translation probability of each word (S105). Thereafter, the boundary identification unit 25 uses a result of the translation probabilities by the statistical information acquisition unit 23 to identify boundaries of a maximum word string (S106).

Then, the learning data replacement unit 26 specifies a pair of deemed compound words and executes replacement of learning data with the pair of deemed compound words (S107). Thereafter, the probability calculation unit 22 uses the learning data after replacement to recalculate the translation probabilities of the words (S108).

Then, in the case where the translation probability indicates improvement (S109: Yes), the candidate evaluation unit 27 decides that the pair of deemed compound words have a translation relationship and registers them as new translation phrases into the translation dictionary DB 14 (S110). On the other hand, in the case where the translation probability is not improved (S109: No), the candidate evaluation unit 27 ends the processing immediately.

[Advantageous Effects]

As described above, the translation processing apparatus 10 determines, in regard to word pairs having a high translation probability, a word example pair of maximum boundaries between which the condition "other words in the vicinity before and after a first language word of a certain word pair have high translation probabilities in both directions with a second language word of the word pair" as a candidate for a compound word pair. Then, the translation processing apparatus 10 recalculates the translation probability of the words using the candidate for the compound word pair and registers, when the translation probability indicates improvement, the words as a new translation phrase. Accordingly, since the translation processing apparatus 10 can accurately cut out a compound word such as a technical term and a non-registered word and extract a translation relationship, the generation accuracy of a translation phrase can be improved.

Further, in the case where a plurality of deemed compound words are specified by single time processing, also it is possible for the translation processing apparatus 10 to evaluate the deemed compound words sequentially one by one, and besides, to evaluate them collectively. Further, in the case where a deemed compound word is decided as a new translation phrase, also it is possible for the translation processing apparatus 10 to first convert a morphological analysis result with the new translation phrase and then repeat calculation of a translation probability and search for a deemed compound word.

Working Example 2

Incidentally, also it is possible to perform boundary decision of a compound word using external information set in advance. Therefore, in the working example 2, an example in which boundary decision of a compound word is executed using external information in addition to the technique according to the working example 1.

[Part-of-Speech Rule]

Figure 11:
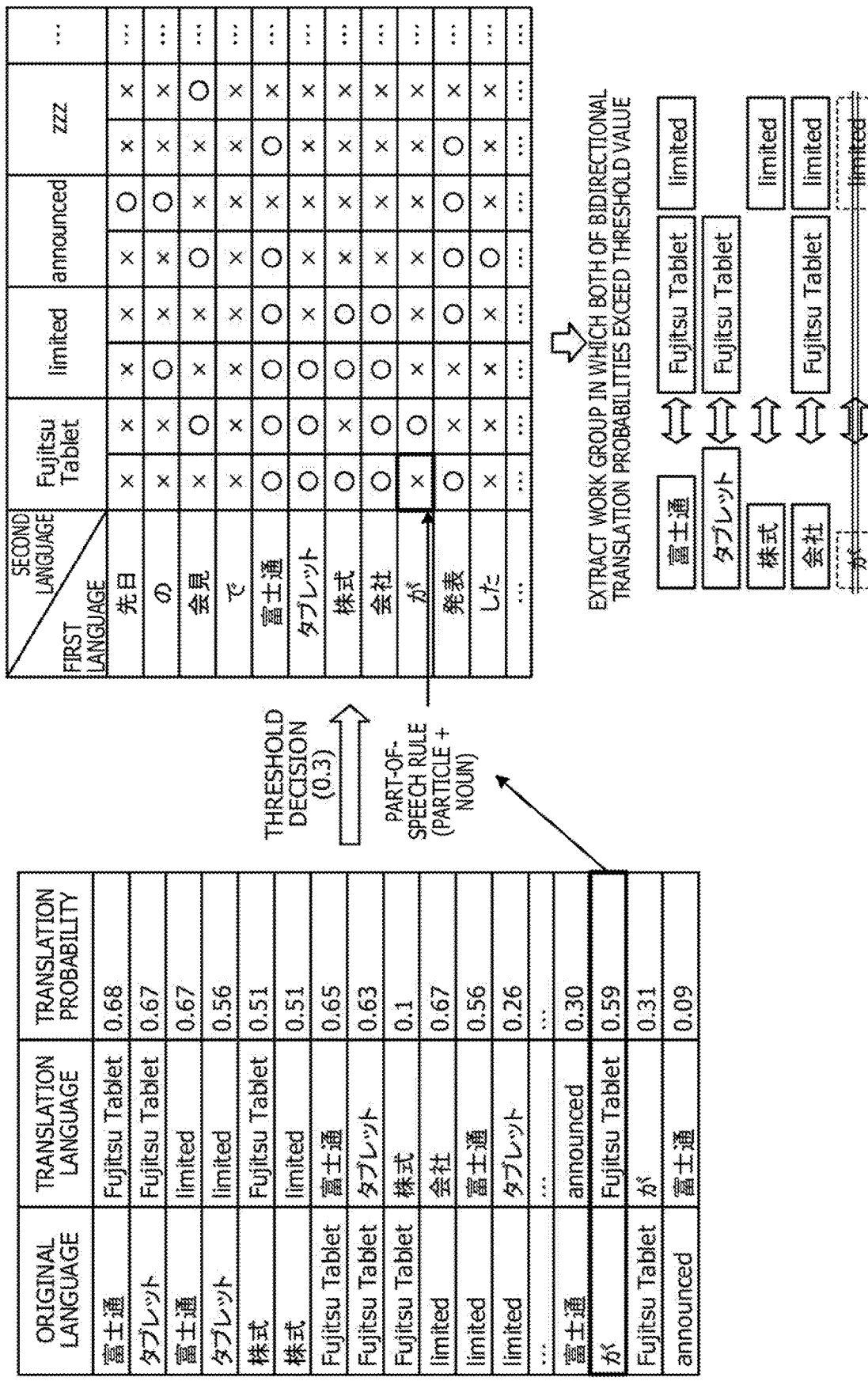
FIG. 11 is a view of specification of a boundary of a compound word based on a part-of-speech rule according to a working example 2.

FIG. 11 is a view of specification of a boundary of a compound word based on a part-of-speech rule according to the working example 2. Here, the translation processing apparatus 10 retains a part-of-speech rule that, in the case where the external information is "particle+noun," for example, a combination of a particle and a noun, the combination is excluded from a target of boundary decision.

For example, as depicted in FIG. 11, since the translation probability from "が" extracted from a document of a first language to "Fujitsu Tablet" extracted from a document of a second language is "0.59" and the translation probability is equal to or higher than a threshold value (0.3), in an ordinary case, the translation processing apparatus 10 sets "○" as statistical information. However, since "が+Fujitsu Tablet" corresponds to "particle+noun" of the part-of-speech rule, the translation processing apparatus 10 sets not "○" but "x" as the statistical information and excludes this from boundary decision. In this manner, the translation processing apparatus 10 can suppress inappropriate boundary decision by using the part-of-speech rule of each language in this manner. The information to be set to the part-of-speech rule can be set and changed arbitrarily.

[Known Translation Phrase]

FIG. 12 is a view depicting specification of a boundary of a compound word based on a known translation phrase according to the working example 2. Here, the translation processing apparatus 10 retains a translation dictionary prepared in advance as external information and executes processing for a known translation phrase registered in the translation dictionary deeming that the translation probabilities in both directions exceed the threshold value.

As depicted in FIG. 12, the translation processing apparatus 10 retains [ 株式会社 : Limited] as a known translation phrase. Then, the translation processing apparatus 10 decides that the translation probability from "株式会社" of the first language into "Limited" of the second language is "0.21" and the translation probability in the opposite direction is "0.1" and that the translation probabilities in both directions are lower than the threshold value (0.3).

In this case, if ordinary, the translation processing apparatus 10 sets "x" as statistical information from "株式会社" to "Limited" and as statistical information from "Limited" to "株式会社." However, since "株式会社: Limited" is registered as the known translation phrase, the translation processing apparatus 10 sets "○" as the statistical information from "株式会社" to "Limited" and as the statistical information from "Limited" to "株式会社." The translation processing apparatus 10 can suppress inappropriate boundary decision in this manner. The known translation phrase is illustrative to the last and can be changed arbitrarily in setting.

[Syntactic Structure]

Figure 13:
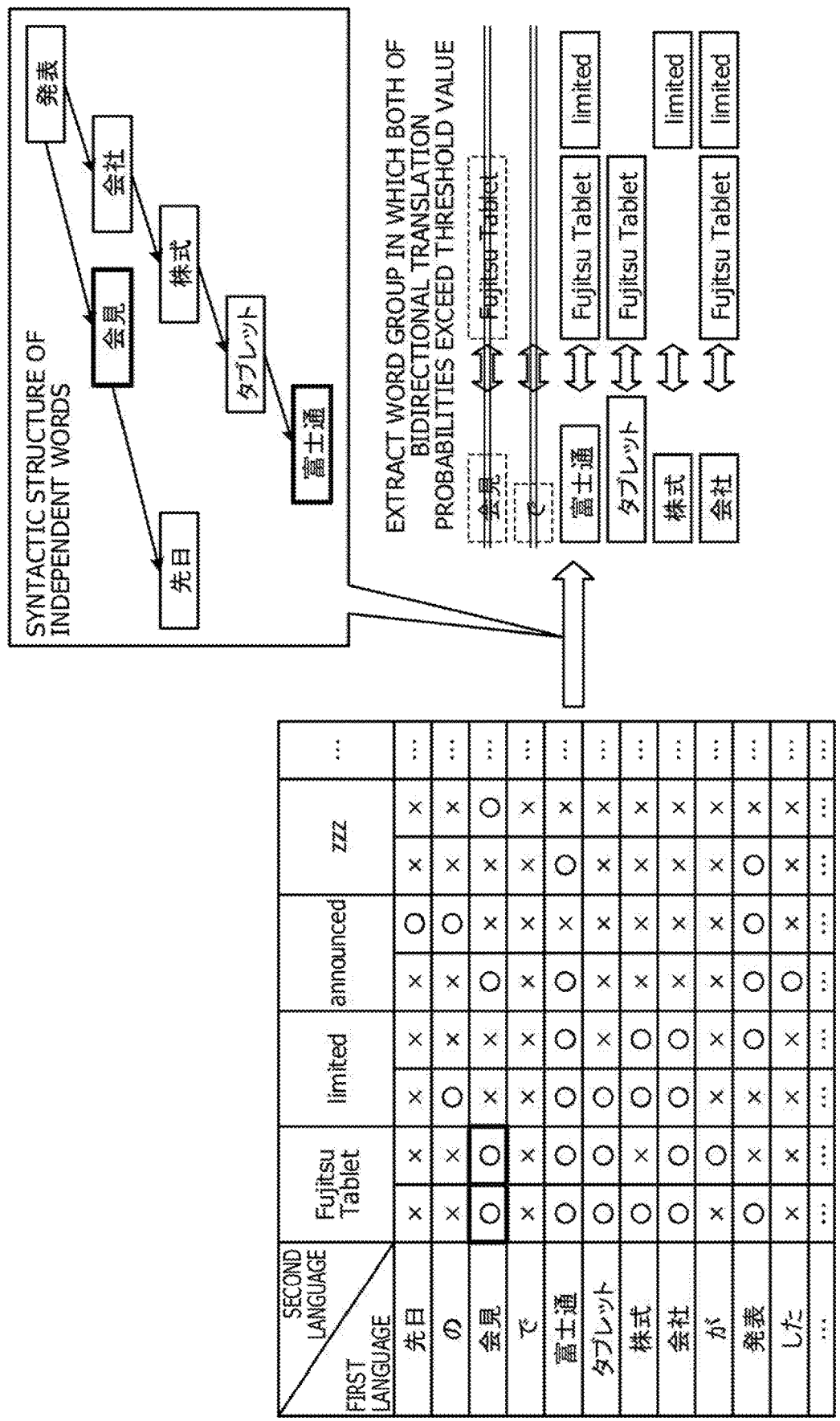
FIG. 13 is a view of specification of a boundary of a compound word based on a syntactic structure according to the working example 2.

FIG. 13 is a view depicting illustration of a boundary of a compound word based on a syntactic structure according to the working example 2. Here, as external information, the translation processing apparatus 10 retains a syntactic structure indicative of a relationship between words and decides a target of a compound word based on the syntactic structure.

As depicted in FIG. 13, the translation processing apparatus 10 retains, as a syntactic structure, a relationship of "発表、会見、先日" and a relationship of "発表、会社、株式、タブレット、富士通." Then, since the translation probabilities of both "会見" of the first language and "Fujitsu Tablet" of the second language are equal to or higher than the threshold value, the translation processing apparatus 10 extracts also the set of "会見" and "Fujitsu Tablet" as a candidate for a compound word.

However, if the syntactic structure is referred to, the translation processing apparatus 10 can specify that the relationship between "会見" and "富士通" extracted as a candidate next to "会見" is not a direct relationship. Therefore, the translation processing apparatus 10 excludes "会見" whose translation probabilities in both directions are equal to or higher than the threshold value from a candidate for a compound word. As a result, the translation processing apparatus 10 can improve the detection accuracy of a boundary.

Working Example 3

Incidentally, although a "comparable corpus" multilingual document pair that is an extraction source of a translation phrase indicates correspondence in gist of contents, since it has imbalance information amounts, the extraction efficiency of a translation phrase is low in comparison with a "parallel corpus" multilingual document pair that exhibits sentence unit full correspondence. Therefore, a technique is demanded by which, when a translation phrase is extracted from a "comparable corpus" multilingual document pair, noise is reduced to improve the accuracy.

Therefore, the working example 3 described below is directed to an example in which, from a "parallel corpus" multilingual document pair, a new multilingual document pair that is learning data for translation phrase extraction is generated to improve the extraction accuracy of a translation phrase.

[Description of Translation Processing Apparatus 50]

Figure 14:
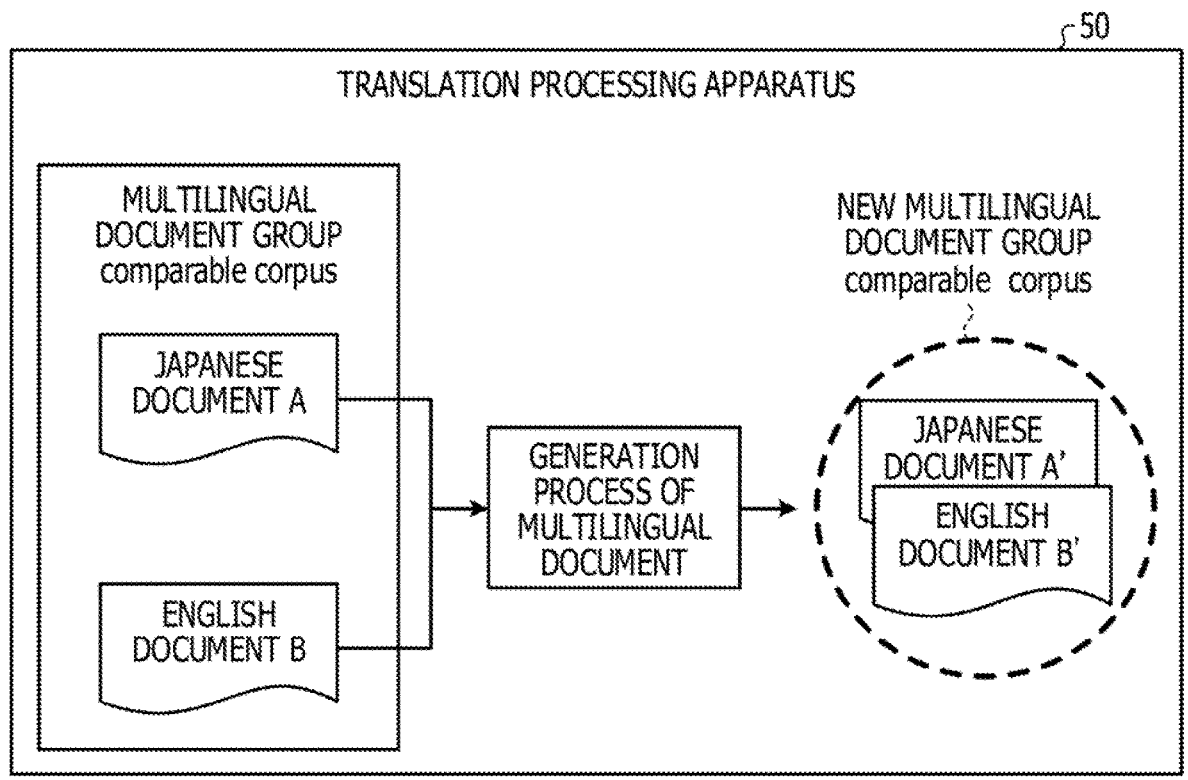
FIG. 14 is a view illustrating generation of a new multilingual document pair according to a working example 3.

FIG. 14 is a view illustrating generation of a new multilingual document pair according to the working example 3. As depicted in FIG. 14, similarly as in the working example 1, a translation processing apparatus 50 retains a Japanese document A—English document B as a multilingual document group that is comparable corpus. Here, the Japanese document A—English document B are a document pair in which same contents are described and the granularity of information is different for each page.

The translation processing apparatus 50 detects and deletes a paragraph that does not differ in meaning in the documents from each multilingual document pair to generate a new multilingual document pair. For example, the translation processing apparatus 50 generates a Japanese document A'-English document B' from the Japanese document A-English document B.

For example, even if a paragraph that is quite different in meaning from that of the entire document is deleted, the meaning of the document does not change significantly. From this, also a new multilingual document pair generated by deleting a paragraph that is not different in meaning has a relationship in which contents correspond to each other and becomes a learning target of translation dictionary extraction. The translation processing apparatus 50 can generate a new multilingual document pair in this manner and can increase learning target data either.

[Functional Configuration]

Figure 15:
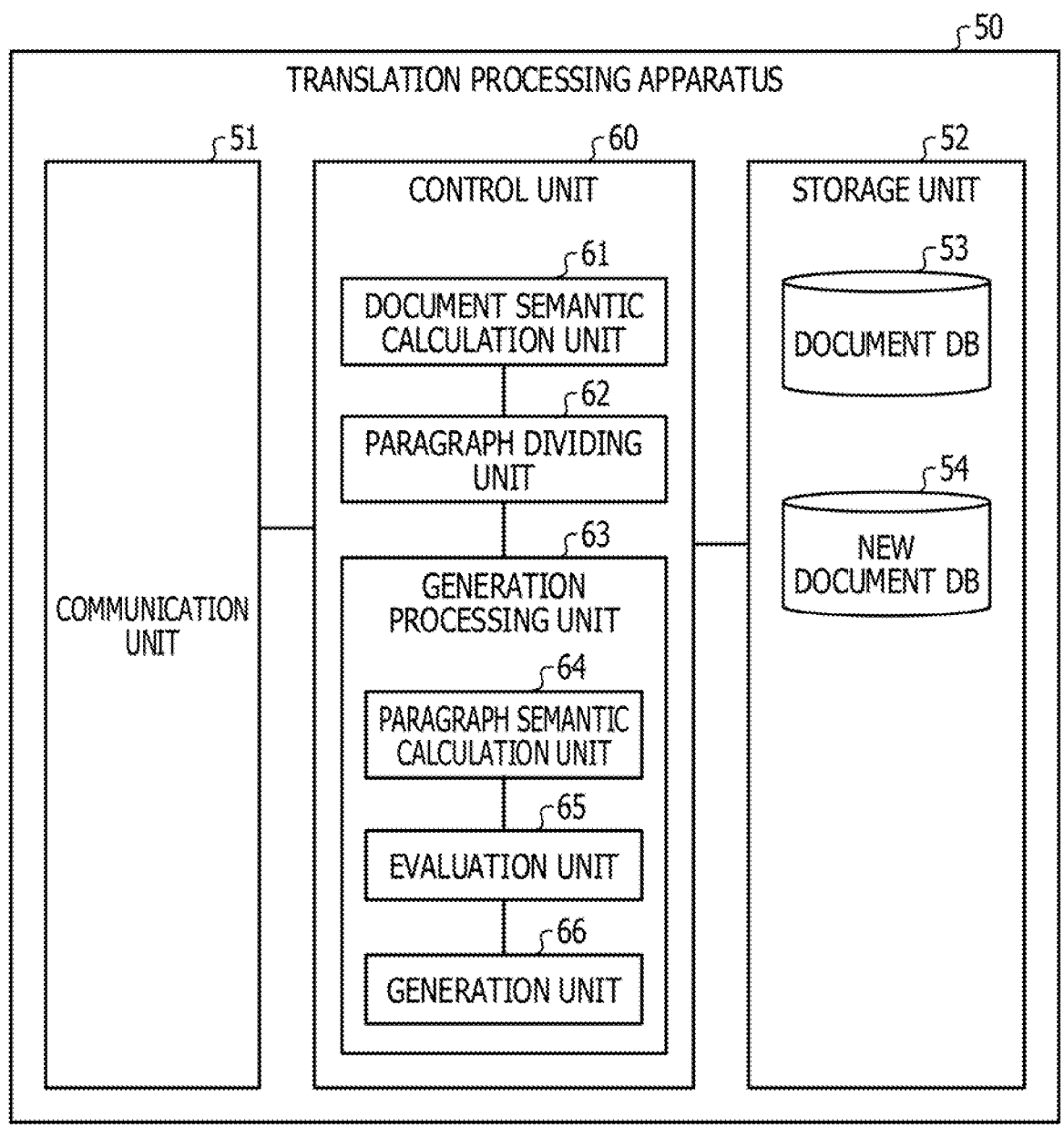
FIG. 15 is a functional block diagram depicting a functional configuration of a translation processing apparatus according to the working example 3.

FIG. 15 is a functional block diagram depicting a functional configuration of a translation processing apparatus according to the working example 3. The translation processing apparatus depicted in FIG. 15 may be the translation processing apparatus 50 depicted in FIG. 14. As depicted in FIG. 15, the translation processing apparatus 50 includes a communication unit 51, a storage unit 52, and a control unit 60.

The communication unit 51 is a processing unit that controls communication with another apparatus and is, for example, a communication interface. For example, the communication unit 51 receives a processing starting instruction from a management apparatus utilized by a manager or the like and transmits a result of processing to the management apparatus. Further, the communication unit 51 acquires document information from various database servers and so forth.

The storage unit 52 is an example of a storage device that stores programs to be executed by the control unit 60 and so forth and is, for example, a memory or a hard disk. The storage unit 52 stores a document DB 53 and a new document DB 54.

The document DB 53 is a database that stores a multilingual document pair of comparable corpus and serves as an extraction source of a translation phrase. For example, the document DB 53 stores a Japanese document A (hereinafter referred to sometimes as document A) described in the Japanese language and an English document (hereinafter referred to sometimes as document B), in which contents same as those of the Japanese language are described in the English language, in an associated relationship with each other. Information of such document pairs stored in the document DB 53 is similar to that in the working example 1, and therefore, detailed description of the information is omitted.

The new document DB 54 is a database that stores a multilingual document pair generated newly by the translation processing apparatus 10. For example, the new document DB 54 stores a multilingual document pair of a Japanese document A' (hereinafter referred to sometimes as document A') and an English document B' (hereinafter referred to sometimes as document B') generated from a multilingual document pair of the document A and the document B.

The control unit 60 is a processing unit that controls the entire translation processing apparatus 50 and is, for example, a processor. The control unit 60 includes a document semantic calculation unit 61, a paragraph dividing unit 62, and a generation processing unit 63.

The document semantic calculation unit 61 is a processing unit that represents meanings of each document itself of a multilingual document pair stored in the document DB 53 with a high-dimensional vector. For example, the document semantic calculation unit 61 converts meanings of each of the document A and the document B into a vector using a known technique such as "topic models" or "Doc2Vec." Then, the document semantic calculation unit 61 outputs resulting semantic vectors of the documents to the generation processing unit 63 and so forth.

The paragraph dividing unit 62 is a processing unit that divides each document of a multilingual document pair stored in the document DB 53 in a unit of a paragraph. For example, the paragraph dividing unit 62 identifies paragraphs of the document A and the document B based on layout information such as a html tag, an indentation, a character indentation, a line space and so forth to divide the document A and the document B into paragraphs.

Figure 16:
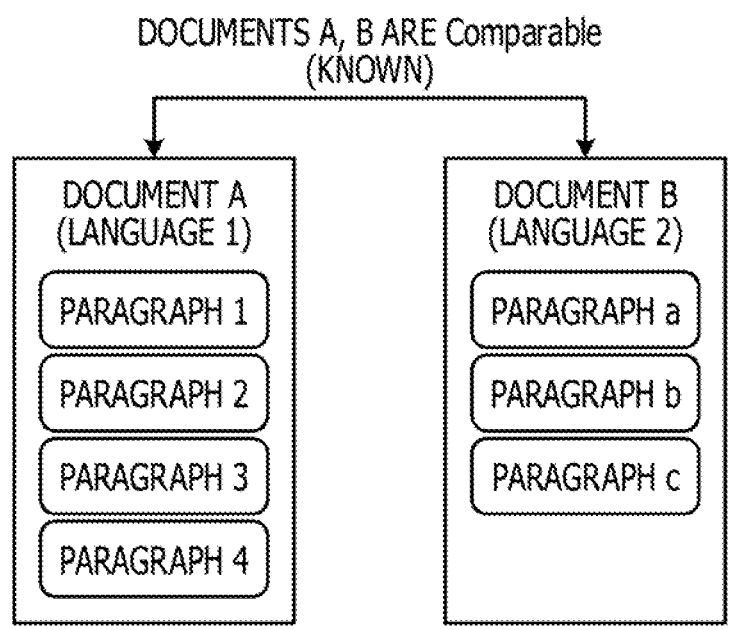
FIG. 16 is a view illustrating a result of paragraph division.

FIG. 16 is a view illustrating a result of paragraph division. As depicted in FIG. 16, the paragraph dividing unit 62 divides the document A into paragraphs 1, 2, 3, and 4 and divides the document B into paragraphs a, b, and c. Then, the paragraph dividing unit 62 retains information of the division into the storage unit 52 and outputs the information to the generation processing unit 63.

The generation processing unit 63 includes a paragraph semantic calculation unit 64, an evaluation unit 65, and a generation unit 66 and is a processing unit that executes detection and deletion of a paragraph, which does not change in meaning before and after deletion, from each document of a multilingual document pair to generate a new multilingual document pair.

The paragraph semantic calculation unit 64 is a processing unit that calculates a vector indicative of meanings of a paragraph when each document divided by the paragraph dividing unit 62 is divided into part of paragraphs and the remaining paragraphs of the document based on information of the paragraphs. For example, the paragraph semantic calculation unit 64 extracts a combination of paragraphs by which one document is divided into two parts and calculates, deeming the two divisional paragraphs of the document as independent documents, a document semantic vector of each paragraph by a technique similar to that by the document semantic calculation unit 61.

Figure 17:
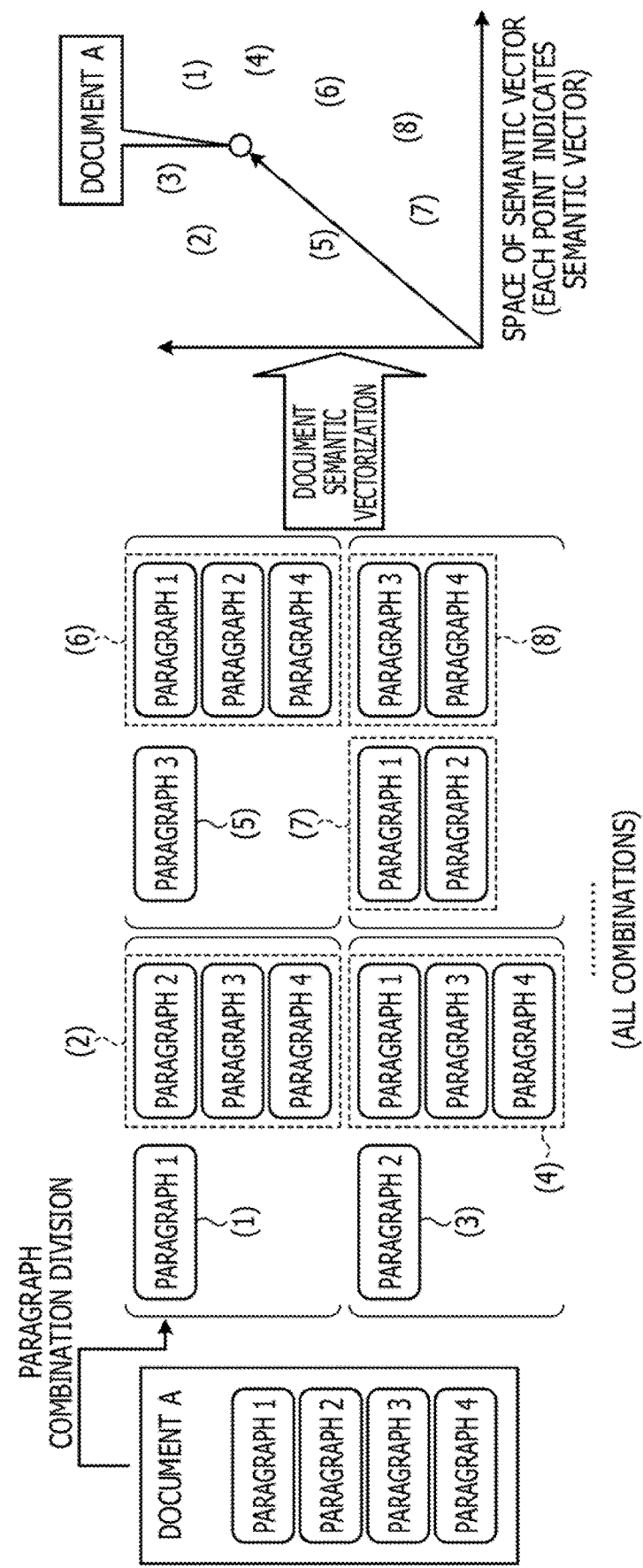
FIG. 17 is a view illustrating an example of calculation of a paragraph semantic vector.

FIG. 17 is a view illustrating an example of calculation of a paragraph semantic vector. As depicted in FIG. 17, the paragraph semantic calculation unit 64 generates, as a combination that can divide a document A, which has paragraphs 1, 2, 3, and 4, into two, such combinations as "(1) paragraph 1 and (2) paragraphs 2 to 4," "(3) paragraph 2 and (4) paragraphs 1, 3, and 4," "(5) paragraph 3 and (6) paragraphs 1, 2, and 4," "(7) paragraphs 1 and 2 and (8) paragraphs 3 and 4" and so forth. Then, the paragraph semantic calculation unit 64 calculates a semantic vector of each of (1) to (8). Thereafter, the paragraph semantic calculation unit 64 outputs a result of the calculation to the evaluation unit 65.

The evaluation unit 65 is a processing unit that evaluates each paragraph of each document to detect a paragraph that can be deleted. For example, the evaluation unit 65 calculates, using document semantic vectors of the combinations of paragraphs calculated by the paragraph semantic calculation unit 64 and document semantic vectors calculated by the document semantic calculation unit 61, a distance between semantic vectors of two divisional paragraphs and the entire documents of a multilingual document pair. Then, the evaluation unit 65 detects a divisional paragraph that can be deleted using a result of the calculation and outputs the deletable divisional paragraph to the generation unit 66.

Figure 18:
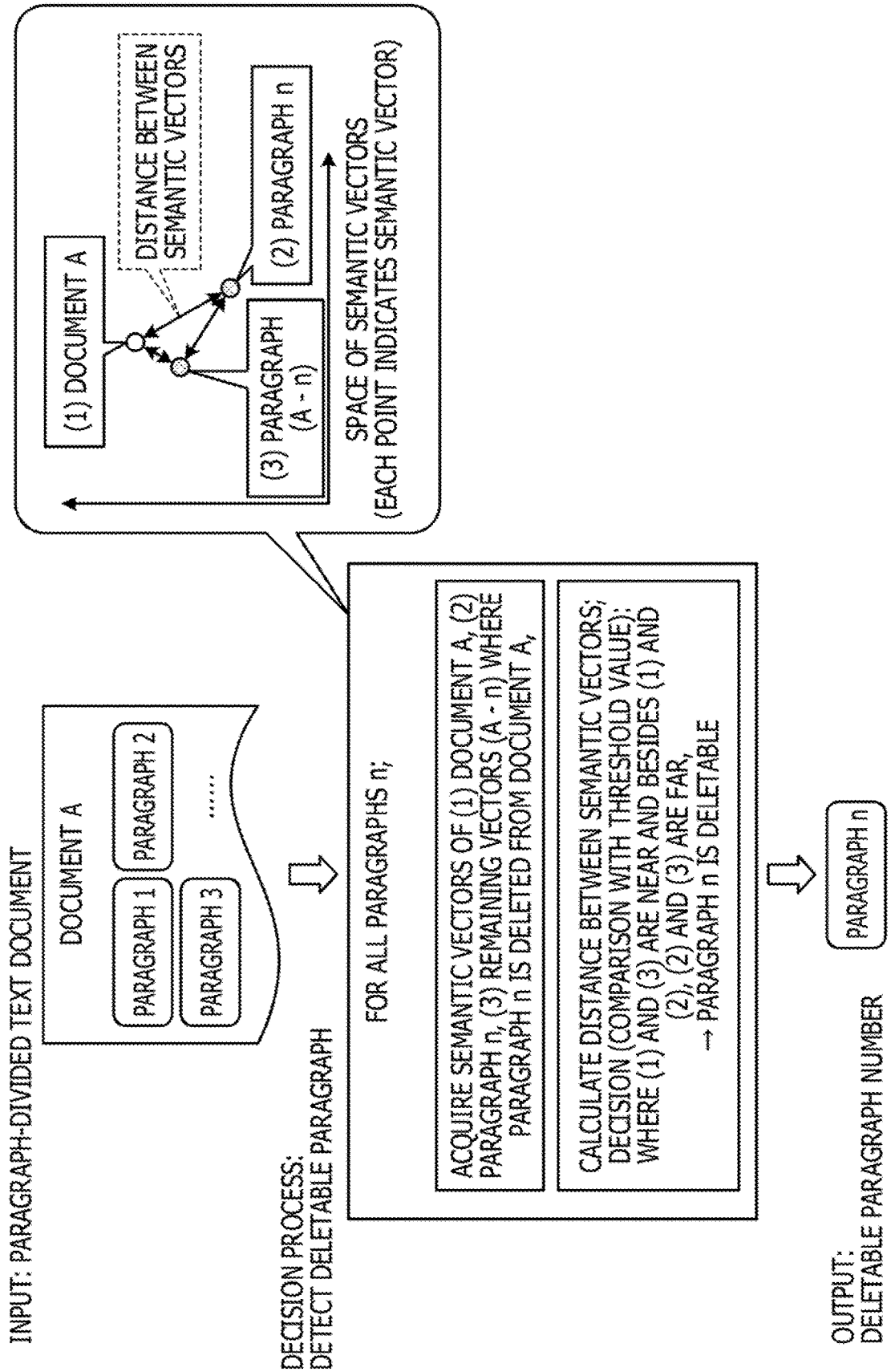
FIG. 18 is a view illustrating a detection technique of a deletable paragraph.

FIG. 18 is a view illustrating a detection technique of a deletable paragraph. As depicted in FIG. 18, the evaluation unit 65 calculates, for all paragraphs n (n is a natural number) in the document A after division into paragraphs, a distance between semantic vectors from (1) the semantic vector of the document A, (2) the semantic vector of the paragraph n, and (3) the semantic vectors of the remaining paragraphs (A-n) where the paragraph n is deleted from the document A. Then, the evaluation unit 65 decides that the paragraph n in regard to which the distance between (1) and (3) is smaller than a threshold value and besides the distance between (1) and (2) and the distance between (2) and (3) are equal to or greater than the threshold value.

For example, the evaluation unit 65 decides that a paragraph can be deleted in the case where the similarity of the semantic vector of the paragraph to the semantic vector of the original document is low and besides the similarity of the semantic vector of the remaining document contents to the semantic vector of the original document is high. This arises from that it is noticed that, in the case where contents of the "paragraph" are far from the meaning (topic and gist) of the entire document, the similarity of the semantic vector of the paragraph to the semantic vector of the entire document is low. Accordingly, even if a paragraph far away from the meaning of the entire document is deleted, the remaining paragraph set can present the meaning of the document.

Figure 19:
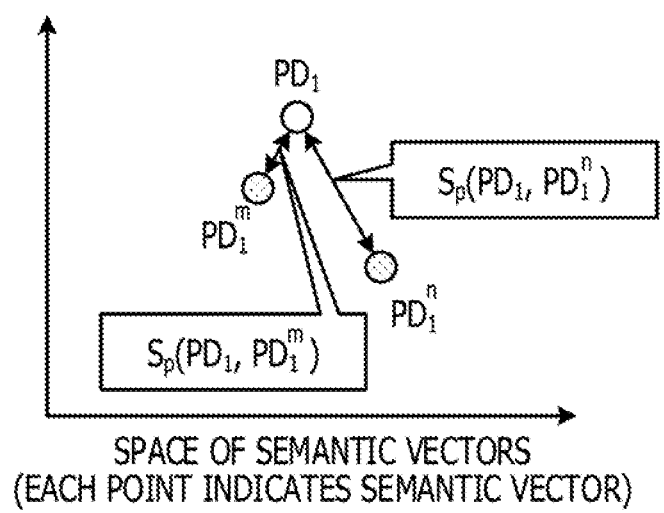
FIG. 19 is a view illustrating a semantic vector space.

Here, details of a semantic vector are described. FIG. 19 is a view illustrating a semantic vector space. Here, description is given taking the document A having m paragraphs as an example. For example, the document semantic calculation unit 61 calculates semantic vectors $\{PD_1, PD_2\}$ in regard to a multilingual documents $\{D_1, D_2\}$. Further, the paragraph semantic calculation unit 64 divides the document A into the [n] paragraph and the remaining [m=1-n] paragraphs, generates a paragraph group of combinations $\{D_1'', D_1''', D_2'', D_2'''\}$, and calculates of their semantic vectors $\{PD_1'', PD_1''', PD_2'', Pd_2'''\}$.

In this state, the evaluation unit 65 calculates a similarity $S_p(PD_1$ and $PD_1'')$ between $PD_1$ and $PD_1''$, a similarity $S_p(PD_1$ and $PD_1''')$ between $PD_1$ and $PD_1'''$, a similarity $S_p(PD_2$ and $PD_2'')$ between $PD_2$ and $PD_2''$, and a similarity $S_p(PD_2$ and $PD_2''')$ between $PD_2$ and $PD_2'''$. Then, in the case where expression (1) and expression (2) are satisfied, the evaluation unit 65 decides that the paragraphs $\{D_1'', D_2''\}$ can be deleted from the multilingual documents $\{D_1, D_2\}$.

[Expression 1]

$$D_1'' \text{ deletion: } S_p(PD_1, PD_1'') > S_a \cap S_p(PD_1, PD_1''') < S_b \quad \text{expression (1)}$$

[Expression 2]

$$D_2'' \text{ deletion: } S_p(PD_2, PD_2'') > S_a \cap S_p(PD_2, PD_2''') < S_b \quad \text{expression (2)}$$

$S_a$ and $S_b$ in the expression 1 and the expression 2 are threshold values. For example, the threshold value $S_a$ is used to decide that, in the case where the paragraph n of a deletion candidate exceeds a restriction or a threshold value for a semantic vector distance to the entire document, the meaning of the paragraph n is different from the meaning of the entire document. The threshold value $S_b$ is used to decide that, in the case where the remaining paragraph m exceeds a restriction or a threshold value for the semantic vector distance for the entire document, the meaning of the paragraph m is different from the meaning of the entire document.

Further, $S_a$ and $S_b$ are set in advance. For example, they can be set depending upon an experience of a user or the like. Also, it is possible to apply a tag to a paragraph, which can be deleted manually, in part of a multilingual document group in advance such that the translation processing apparatus 50 can calculate the similarities $S_p(PD_1$ and $PD_1'')$, $S_p(PD_1$ and $PD_1''')$, $S_p(PD_2$ and $PD_2'')$, and $S_p(PD_2$ and $PD_2''')$ and detect a known deletable paragraph. Also, it is possible to set $S_a$ and $S_b$ for individual languages.

Referring back to FIG. 15, the generation unit 66 is a processing unit that deletes, from each document of the multilingual document pair, a paragraph that is decided to be deletable by the evaluation unit 65 to generate a new multilingual document pair. For example, the generation unit 66 deletes, from an original multilingual document pair stored in the document DB 53, a deletable paragraph detected by the evaluation unit 65 to generate a multilingual document pair in which new contents correspond to the remaining paragraphs, and stores the generated multilingual document pair into the new document DB 54.

Figure 20:
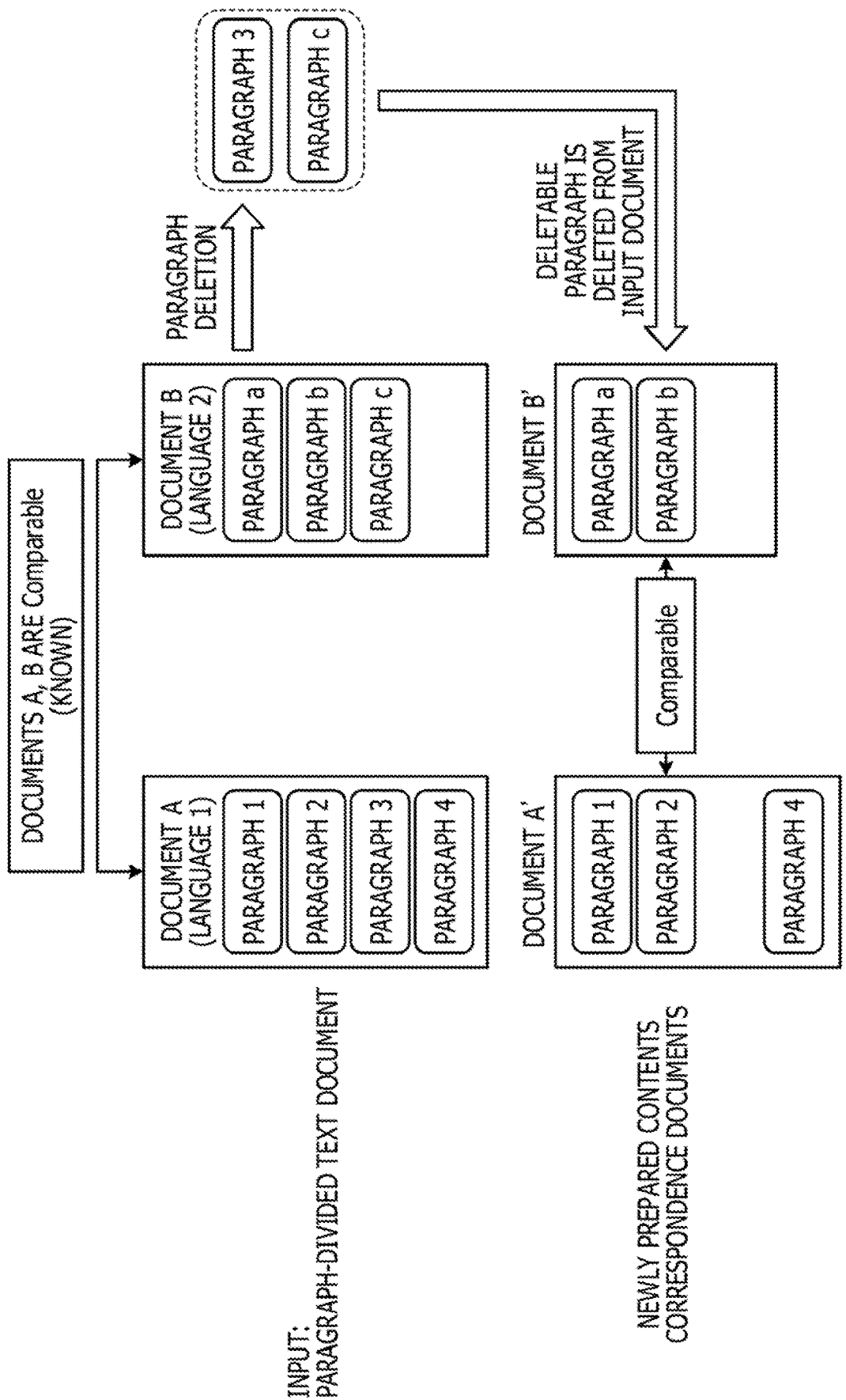
FIG. 20 is a view illustrating generation of a new multilingual document pair.

FIG. 20 is a view illustrating generation of a new multilingual document pair. It is assumed that, as depicted in FIG. 20, the evaluation unit 65 decides that a paragraph 3 and a paragraph c are deletable from a document A (paragraphs 1, 2, 3, and 4) and a document B (paragraphs a, b, and c) each of which is comparable corpus. In this case, the generation unit 66 generates a document A' in which the paragraph 3 is deleted from the document A (paragraphs 1, 2, 3, and 4) and a document B' in which the paragraph c is deleted from the document B (paragraphs a, b, and c).

Then, the generation unit 66 stores the document A' (paragraphs 1, 2, and 4) and the document B' (paragraphs a and b) as a new multilingual document pair into the new document DB 54. Since the meaning of the documents from that of the original documents does not change very much after the paragraph deletion, the comparable relationship of the original document pair is inherited by the new document pair.

[Flow of General Processing]

Figure 21:
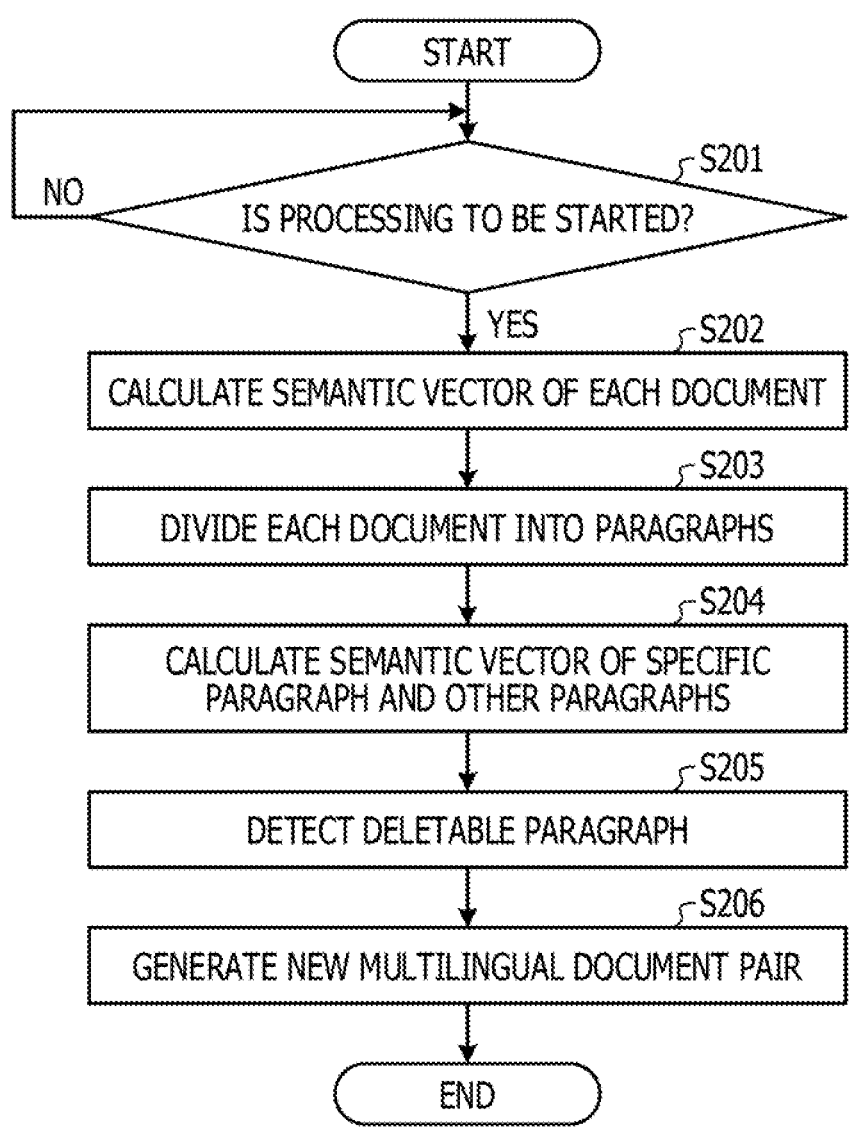
FIG. 21 is a flow chart depicting a flow of a generation process according to the working example 3.

FIG. 21 is a flow chart depicting a flow of a generation process according to the working example 3. As depicted in FIG. 21, if an instruction to start processing is received (S201: Yes), the document semantic calculation unit 61 calculates a semantic vector of each document of a multilingual document pair (S202). Then, the paragraph dividing unit 62 divides each document into paragraphs (S203).

Then, the generation processing unit 63 calculates a semantic vector of a noticed paragraph and a semantic vector of the other paragraphs (S204). The generation processing unit 63 detects deletable paragraphs using a distance of the semantic vector between the paragraphs (S205). Thereafter, the generation processing unit 63 deletes the deletable paragraphs to generate a new multilingual document pair (S206).

[Detailed Flow of Processing]

Figure 22:
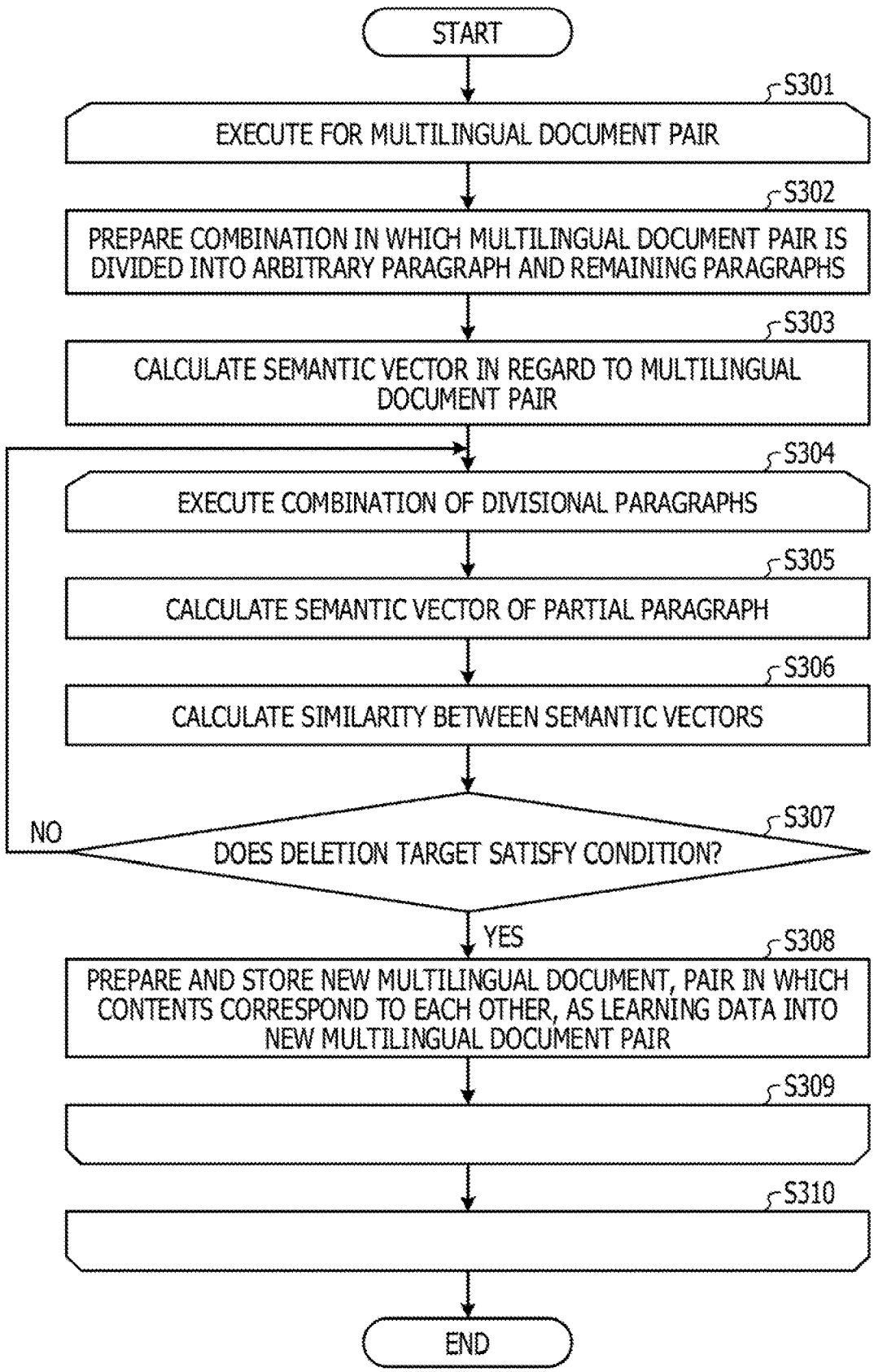
FIG. 22 is a flow chart depicting a detailed flow of a generation process according to the working example 3.

FIG. 22 is a flow chart depicting a detailed flow of a generation process according to the working example 3. This process corresponds to step S204 to step S206 of FIG. 21.

As depicted in FIG. 22, the generation processing unit 63 executes a loop process of S301 to S310 for a multilingual document pair. For example, the generation processing unit 63 generates combinations of an arbitrary paragraph of a multilingual document pair and paragraphs obtained by dividing the remaining paragraph of the multilingual document pair (S302). Then, the generation processing unit 63 calculates a semantic vector in regard to the multilingual document pair (S303).

Thereafter, the generation processing unit 63 executes the loop process at S304 to S307 for the combinations of the divisional paragraphs. For example, the generation processing unit 63 calculates a semantic vector of each of the partial paragraphs generated at step S303 (S305) and calculates a similarity between the calculated semantic vectors of the partial paragraphs (S306).

Then, in the case where a similarity between semantic vectors satisfies the conditions (condition (1) and condition (2) described hereinabove) (S307: Yes), the generation processing unit 63 generates a new multilingual document pair in which the paragraph is deleted (S308). On the other hand, in the case where the similarity between the semantic vectors does not satisfy the conditions (S307: No), the generation processing unit 63 repeats the process at step S304 and the subsequent processes.

Working Example 4

Incidentally, also it is possible to perform the decision regarding whether or not a paragraph is deletable using metadata of documents, external information or the like. Therefore, the working example 4 is directed to an example in which external information or the like is used to perform decision of whether or not a paragraph is deletable in addition to the technique according to the working example 1.

[Document Information]

Figure 23:
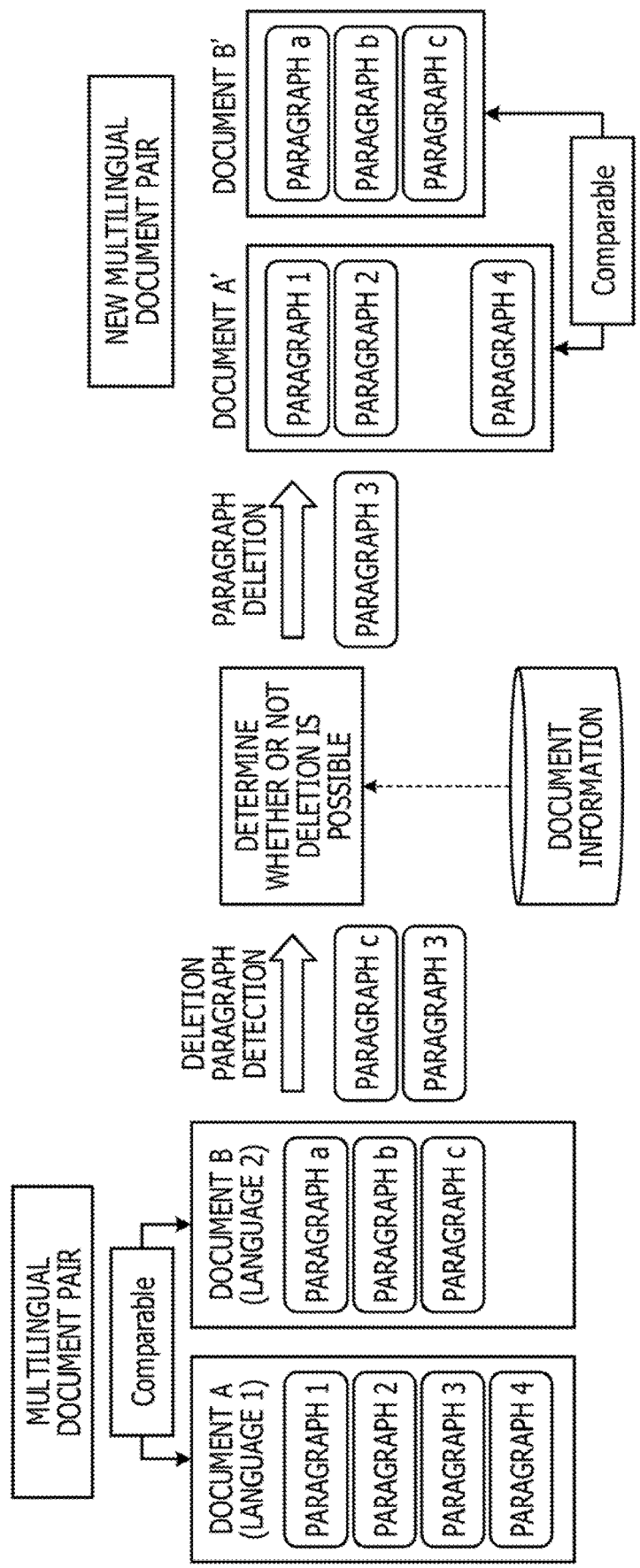
FIG. 23 is a view illustrating decision of deletability based on document information according to a working example 4.

FIG. 23 is a view illustrating decision of deletability based on document information according to the working example 4. Here, the translation processing apparatus 50 stores, as document information, character numbers of documents and paragraphs, overall appearance frequencies of words appearing in the documents and the paragraphs, and so forth.

For example, as depicted in FIG. 23, in the case where it is decided by the technique of the working example 3 that the paragraph 3 of the document A and the paragraph c of the document B are a deletion target, the translation processing apparatus 50 refers to the document information of the documents and exclude the paragraph 3 that satisfies the exclusion conditions from the deletion target.

For example, the evaluation unit 65 of the translation processing apparatus 50 calculates the difference ($WD_1/WD_2$) between the size of the document $D_1$ (character number: $WD_1$) and the size of the document $D_2$ (character number: $WD_2$) of the multilingual documents $\{D_1, D_2\}$ and does not perform deletion of any paragraph if the document D1 is shorter than a threshold value. The difference may be "$WD_2 - WD_1$."

Further, the evaluation unit 65 calculates the ratio ($WD_1{}^n/WD_1$) of the character number of the paragraph $WD_1{}^n$ to that of the document $D_1$ and does not perform deletion of the paragraph in the case where the ratio is equal to or higher than a threshold value. Further, the evaluation unit 65 calculates a term frequency inverse document frequency (TFIDF) of a phrase $D_1{}^{n,i}$ of the paragraph $D_1{}^n$ and does not perform deletion of the paragraph if the TFIDF of all phrases of the paragraph $D_1{}^n$ is equal to or higher than the threshold value. The TFIDF is an example of an importance degree.

In this manner, in the case where original documents are short, in the case where the number of paragraphs of each original image is small and in the case where the appearance ratio of a phrase in a paragraph of a deletion target is high, the influence each paragraph has on the meaning of the document itself is high, and deletion of a paragraph makes the document short and makes the document less suitable as learning data for extracting a translation phrase. Therefore, the translation processing apparatus 50 suppresses deletion of a paragraph.

[Known Translation Phrase]

Figure 24:
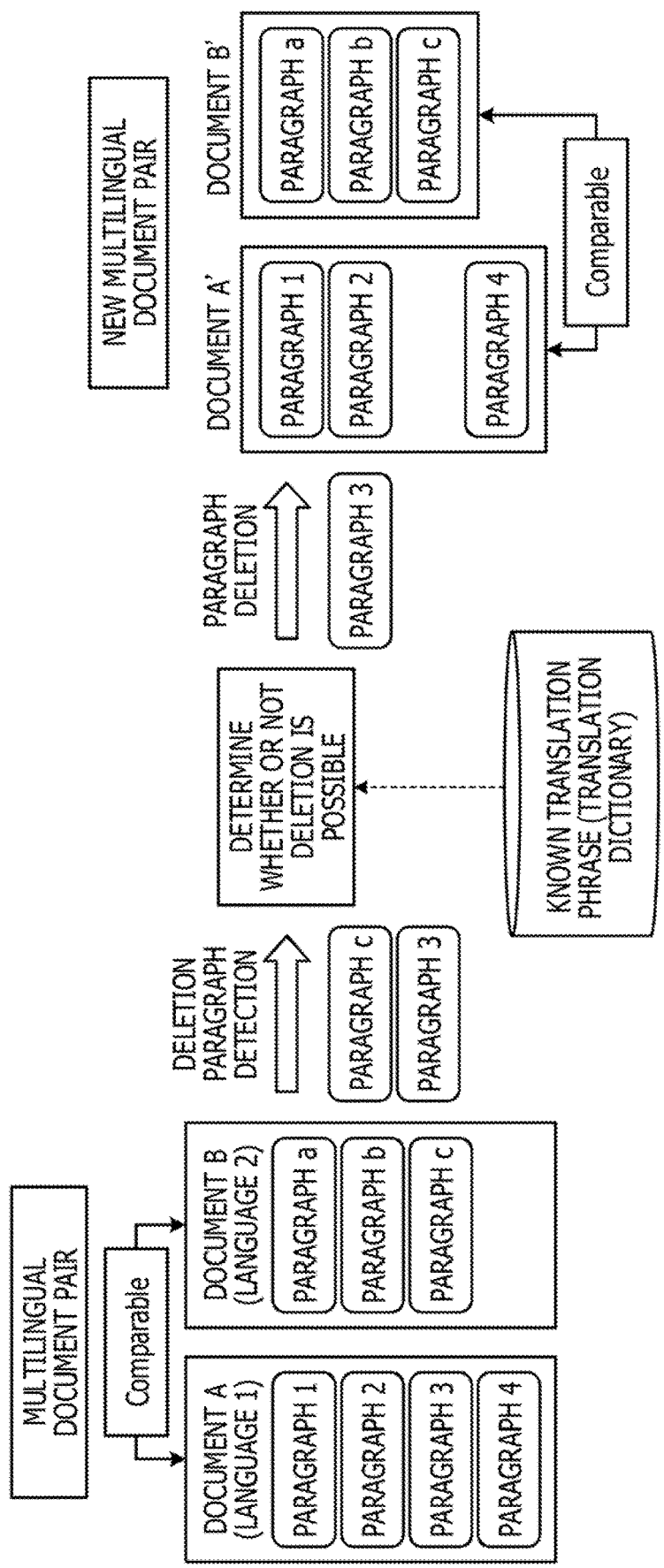
FIG. 24 is a view illustrating decision of deletability based on a known translation phrase according to the working example 4.

FIG. 24 is a view illustrating decision of deletability based on a known translation phrase according to the working example 4. Here, the translation processing apparatus 50 retains a translation dictionary prepared in advance as document information.

For example, as depicted in FIG. 24, in the case where it is decided by the technique of the working example 3 that the paragraph 3 of the document A and the paragraph c of the document B are a deletion target, the translation processing apparatus 50 refers to a known translation phrase and excludes the paragraph 3 that satisfies the conditions from the deletion target.

For example, the evaluation unit 65 of the translation processing apparatus 50 calculates the ratio "$TD_1{}^{n,i}/$character number ($WD_1$)" of the word number $TD_1{}^{n,i}$ in the document $D_1$ in the case where the translation phrase of the phrase $D_1{}^{n,i}$ of the paragraph $D_1{}^n$ of a deletion candidate in regard to the multilingual documents $\{D_1, D_2\}$ is $D_2{}^{n,i}$, and does not perform deletion in the case where the ratio is equal to or higher than the threshold value. For example, in the case where $TD_1{}^{n,i}$ occupies a large part, since many translation phrases appear in the paragraph, the translation processing apparatus 50 does not delete the phrase $D_1{}^{n,i}$.

Working Example 5

Incidentally, although the working example 1 or the working example 2 can be adopted for a technique for calculating a translation phrase using a new multilingual document pair generated by the working example 3 or the working example 4, alto it is possible to adopt other techniques than them. Therefore, the working example 5 described below is directed to examples of a technique for calculating a translation phrase from a new multilingual document pair.

Particular Example 1

Figure 25:
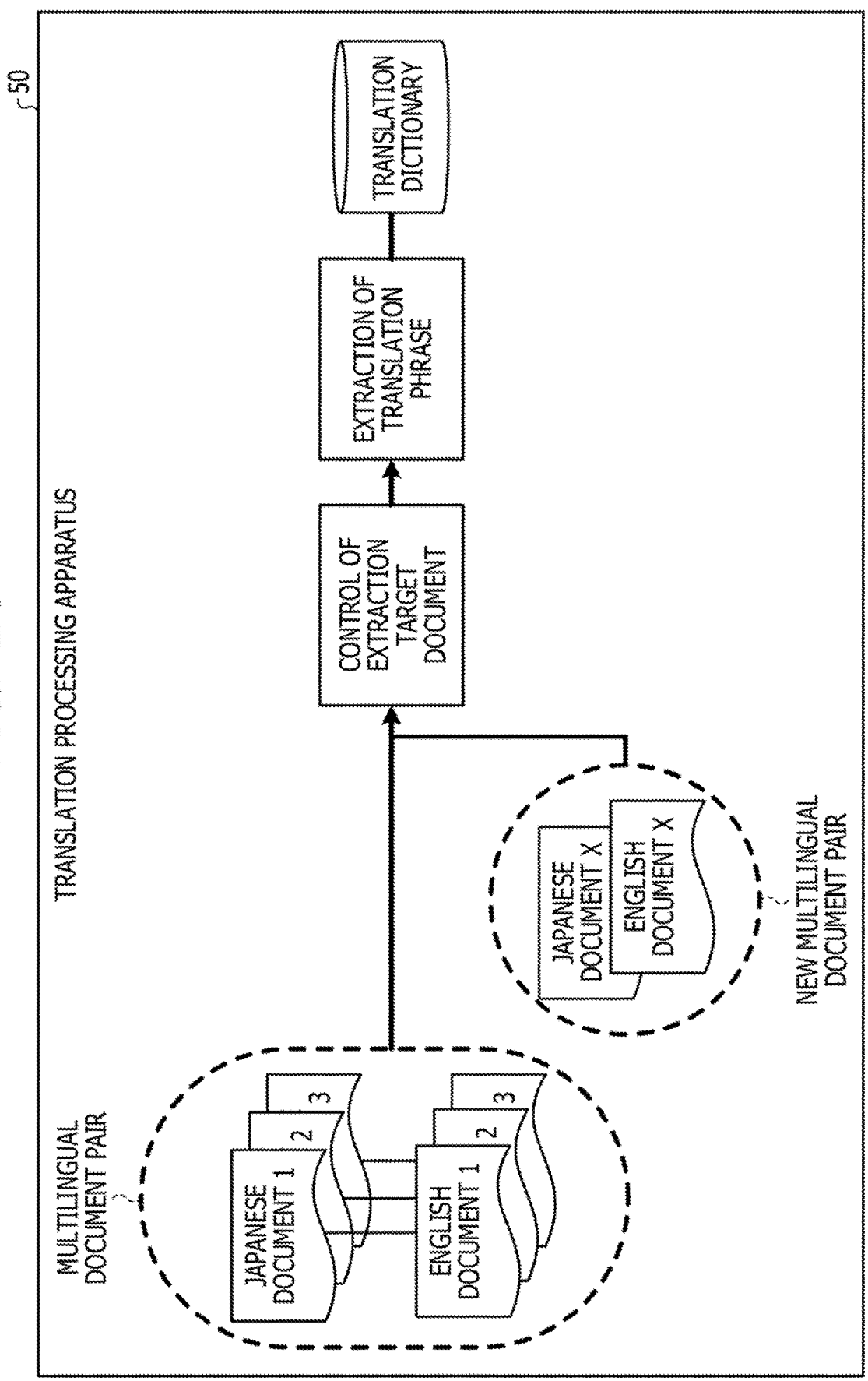
FIG. 25 is a view illustrating an extraction example 1 of a translation phrase according to a working example 5.

FIG. 25 is a view illustrating an extraction example 1 of a translation phrase according to the working example 5. As depicted in FIG. 25, the translation processing apparatus 50 can extract a translation phrase from learning data for which only an original multilingual document pair, only a new multilingual document pair, or both an original multilingual document pair and a new multilingual document pair are used.

For example, the translation processing apparatus 50 can compare file numbers of an original multilingual document pair and a new multilingual document pair with each other and select one of the multilingual document pairs having a greater file number. Also, it is possible for the translation processing apparatus 50 to select one of the multilingual document pairs in which the file number satisfies a standard (threshold value). Also, it is possible for the translation processing apparatus 50 to calculate a character number of the original multilingual document pair and the new multilingual document pair and select the multilingual document pair that includes a greater number of files and besides includes a greater number of characters.

Particular Example 2

Figure 26:
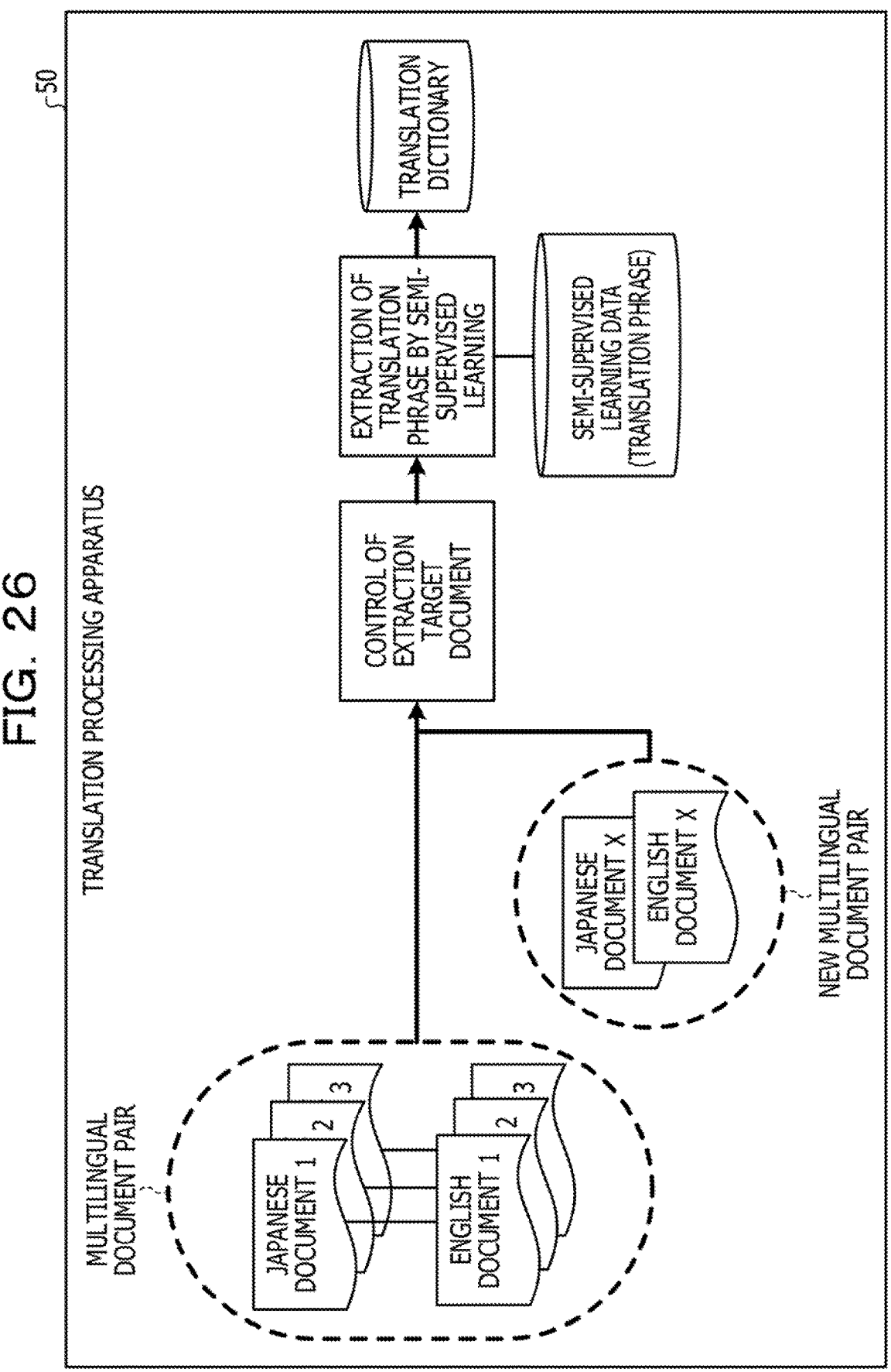
FIG. 26 is a view illustrating an extraction example 2 of a translation phrase according to the working example 5.

FIG. 26 is a view illustrating an extraction example of a translation phrase according to the working example 5. As depicted in FIG. 26, the translation processing apparatus 50 can execute extraction of a translation phrase and generation of a translation dictionary by semi-supervised learning using an original multilingual document pair or a new multilingual document pair as learning data.

For example, the translation processing apparatus 50 executes semi-supervised learning using the technique of Japanese Laid-open Patent Publication No. 2018-10514, which extracts a translation phrase from a multilingual document pair in which contents of two documents correspond to each other. For example, the translation processing apparatus 50 registers translation phrases of several higher ranks or translation phrases whose score value is equal to or higher than a threshold value based on scores calculated by the technique of Japanese Laid-open Patent Publication No. 2018-10514.

Working Example 6

Although several working examples of the present technology have been described, the present technology may be carried out in various forms in addition to the working examples described above.

[Usage Form]

Figure 27:
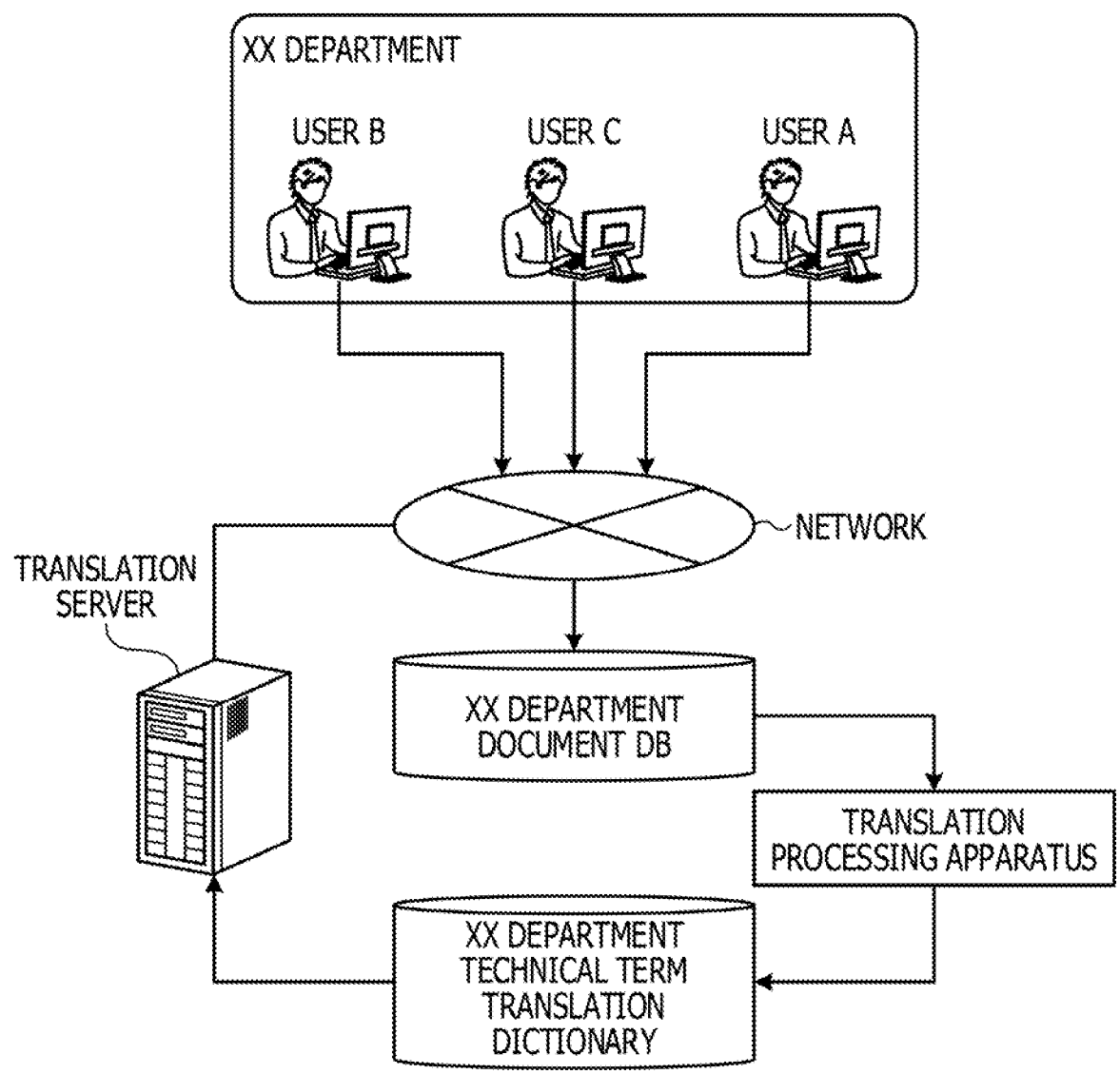
FIG. 27 is a view illustrating an example of a usage form.

The translation processing apparatus of the working examples 1 to 4 described hereinabove can be used by users of a specific community. FIG. 27 is a view illustrating an example of a usage form. As depicted in FIG. 27, the translation processing apparatus of the working examples 1 to 4 are installed on a network such as the Internet or a company network and are used by users of a specific community such as a department or a company to prepare a technical term translation dictionary of the department from a department document DB, in which multilingual document groups prepared and updated daily by such users of the community and store the technical term translation dictionary into a translation server. This makes it possible for a user to use the translation dictionary stored in the translation server to perform translation of the documents or grasping of contents of the documents.

[Data, Numerical Values, Etc.]

The numerical values, data examples, numbers of documents, numbers of paragraphs and so forth used in the working examples described above are examples to the last and can be changed arbitrarily. Further, although the working examples described above are directed to an example in which a second multilingual document pair (comparable corpus) in which the two documents correspond to each other in the gist of contents is made a target, also it is possible to target a first multilingual document pair (parallel corpus) in which the two documents correspond to each other in a unit of a row. Also, the languages of a multilingual document pair are not limited to the Japanese language and the English language, and other languages such as the French language or the Chinese language can be used.

[Deletability of Paragraph]

For example, a technique other than the decision technique described hereinabove in connection with the working examples can be used. For example, in the case where a known translation phrase associated with a phrase decided as a deletion target in the first document and included in the paragraph c is included at a given number of places or more in the second document, also it is possible for the translation processing apparatus 50 to exclude the paragraph c from the deletion target. Further, although an example in which a paragraph is deleted from both documents of a multilingual document pair is described, this is not restrictive, and also it is possible to delete a paragraph from only one of documents of a multilingual document pair.

[System]

The processing procedures, control procedures, particular names, and information including various data and parameters specifically indicated in the documents described hereinabove and the drawings can be changed arbitrarily unless otherwise specified.

Further, the components of the devices depicted in the drawings are functional and conceptive and may not necessarily be physically configured as depicted. For example, specific forms of device distribution and integration are not limited to those depicted in the drawing. For example, all or part of the devices can be functionally or physically distributed or integrated in an arbitrary unit in accordance with various loads, use situations and so forth. For example, also it is possible to implement the translation processing apparatus 10 of the working examples 1 and 2 and the translation processing apparatus 50 of the working examples 3 and 4 using servers different from each other or using a same server.

Furthermore, each of the processing functions included in each apparatus can be entirely or partly implemented by a central processing unit (CPU) and a program analyzed and executed by the CPU or by hardware according to wired logics.

[Hardware]

Figure 28:
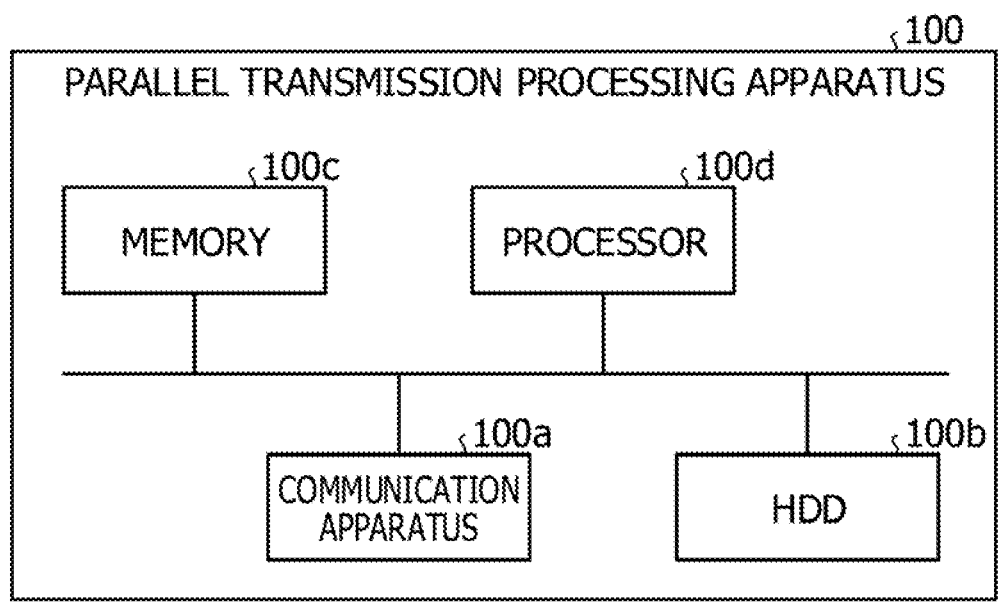
FIG. 28 is a view illustrating an example of a hardware configuration.

Further, since the translation processing apparatus 10 and the translation processing apparatus 50 have a similar hardware configuration, they are described here as translation processing apparatus 100. FIG. 28 is a view depicting an example of a hardware configuration. As depicted in FIG. 28, the translation processing apparatus 100 includes a communication apparatus 100a, a hard disk drive (HDD) 100b, a memory 100c, and a processor 100d. Further, the components depicted in FIG. 28 are coupled to each other by a bus or the like.

The communication apparatus 100a is a network interface card or the like and performs communication with another server. The HDD 100b stores a program for causing the functions depicted in FIG. 2 or FIG. 16 to operate and the DBs.

The processor 100d reads out a program for the execution of processes similar to those of the processing units depicted in FIG. 2 from the HDD 100b or the like and deploys the program in the memory 100c to operate a specific process for executing the functions described with reference to FIG. 2 and so forth. For example, this process executes functions similar to those of the processing units included in the translation processing apparatus 10. For example, the processor 100d reads out a program having functions similar to those of the morphological analysis unit 21, the probability calculation unit 22, the statistical information acquisition unit 23, the detection processing unit 24 and so forth from the HDD 100b or the like. Then, the processor 100d executes a specific process for executing processes similar to those of the morphological analysis unit 21, the probability calculation unit 22, the statistical information acquisition unit 23, the detection processing unit 24 and so forth. This similarly applies also to FIG. 16.

In this manner, the translation processing apparatus 10 operates as an information processing apparatus that executes a translation processing method by reading out and executing a program. Further, the translation processing apparatus 10 can implement also functions similar to those of the working examples described hereinabove by reading out the program described above by a medium reading apparatus and executing the read out program. The programs referred to in the other working examples are not restricted to being executed by the translation processing apparatus 10. For example, the present technology can be applied similarly also in such a case in which the program is executed by some other computer or server or in such a case in which the program is executed cooperatively by some other computer and server.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A translation processing method executed by a computer, the translation processing method comprising:
   calculating a first translation probability from each of first morphemes included in a first document described in a first language into each of second morphemes included in a second document, whose contents are substantially equivalent to those of the first document, described in a second language and a second translation probability from each of the second morphemes into each of the first morphemes;
   extracting a morpheme pair in which the first translation probability and the second translation probability are equal to or higher than a threshold value; and
   generating translation phrases in the first document and the second document based on the extracted morpheme pair,
   wherein the extracting process includes specifying a plurality of morpheme pairs in each of which translation probabilities in both directions of the first translation probability and the second translation probability are equal to or higher than the threshold value, and wherein the generating process includes joining the plurality of morpheme pairs into one word to generate the translation phrases,
   wherein the translation processing method further includes:
   generating a deemed compound word so that the plurality of morpheme pairs are deemed as one word;
   identify a third translation probability and a fourth translation probability while the deemed compound word is taken as one morpheme; and
   generating translation phrases having the deemed compound word as one word when the third translation probability and the fourth translation probability are higher than the first translation probability and the second translation probability.

2. The translation processing method according to claim 1, wherein the extracting process includes determining a maximum range deemed as the deemed compound word using translation probabilities in both directions of adjacent ones of the first morphemes and translation probabilities in both directions of adjacent ones of the second morphemes.

3. The translation processing method according to claim 1, wherein in the extracting process, irrespective of each calculated translation probability, a first translation probability or the second translation probability of a morpheme that is applicable as a particle designated in advance the morpheme is treated to be lower than the threshold value or a first translation probability or a second translation probability of a morpheme that is applicable as a known translation phrase is treated to be equal to or higher than the threshold value.

4. A non-transitory computer-readable storage medium storing a program that causes a computer to execute a process, the process comprising:
   calculating a first translation probability from each of first morphemes included in a first document described in a first language into each of second morphemes included in a second document included in a second document in which contents substantially equivalent to those of the first document are described in a second language and a second translation probability from each of the second morphemes into each of the first morphemes;
   extracting a morpheme pair in which the first translation probability and the second translation probability are equal to or higher than a threshold value and which is a set of the first language and the second language; and
   generating translation phrases in the first document and the second document based on the extracted morpheme pair,
   wherein the extracting process includes specifying a plurality of morpheme pairs in each of which translation probabilities in both directions of the first translation probability and the second translation probability are equal to or higher than the threshold value, and wherein the generating process includes joining the plurality of morpheme pairs into one word to generate the translation phrases, wherein the process further includes:

generating a deemed compound word so that the plurality of morpheme pairs are deemed as one word;

identify a third translation probability and a fourth translation probability while the deemed compound word is taken as one morpheme; and generating translation phrases having the deemed compound word as one word when the third translation probability and the fourth translation probability are higher than the first translation probability and the second translation probability.

* * * * *